United States Patent [19]

Saegusa et al.

[11] Patent Number: 4,942,413
[45] Date of Patent: Jul. 17, 1990

[54] CAMERA

[75] Inventors: Takashi Saegusa, Kawasaki; Tetsuro Goto, Chiba; Seiichi Yasukawa, Kawasaki, all of Japan

[73] Assignee: Nikon Corporation, Tokyo, Japan

[21] Appl. No.: 354,397

[22] Filed: May 19, 1989

[30] Foreign Application Priority Data

May 26, 1988 [JP] Japan .................................. 63-129029
May 27, 1988 [JP] Japan .................................. 63-129573
May 30, 1988 [JP] Japan ............................. 63-71340[U]

[51] Int. Cl.$^5$ .............................................. G03B 1/12
[52] U.S. Cl. ............................................... 354/173.11
[58] Field of Search ................ 354/106, 173.1, 173.11, 354/234.1

[56] References Cited

FOREIGN PATENT DOCUMENTS 61-167934 7/1986 Japan .

Primary Examiner—Michael L. Gellner
Attorney, Agent, or Firm—Shapiro and Shapiro

[57] ABSTRACT

A camera which can receive an accessory for performing a data printing operation on a film surface and can execute data communicating with the accessory is disclosed. The camera has a means for identifying whether or not communication is attained between the camera and the accessory and a means for transmitting a printing signal for causing the accessory to start the data printing operation from the camera to the accessory within a predetermined period of time. The transmission means changes a transmission time of the printing signal in accordance with the identification result of the identification means.

6 Claims, 24 Drawing Sheets

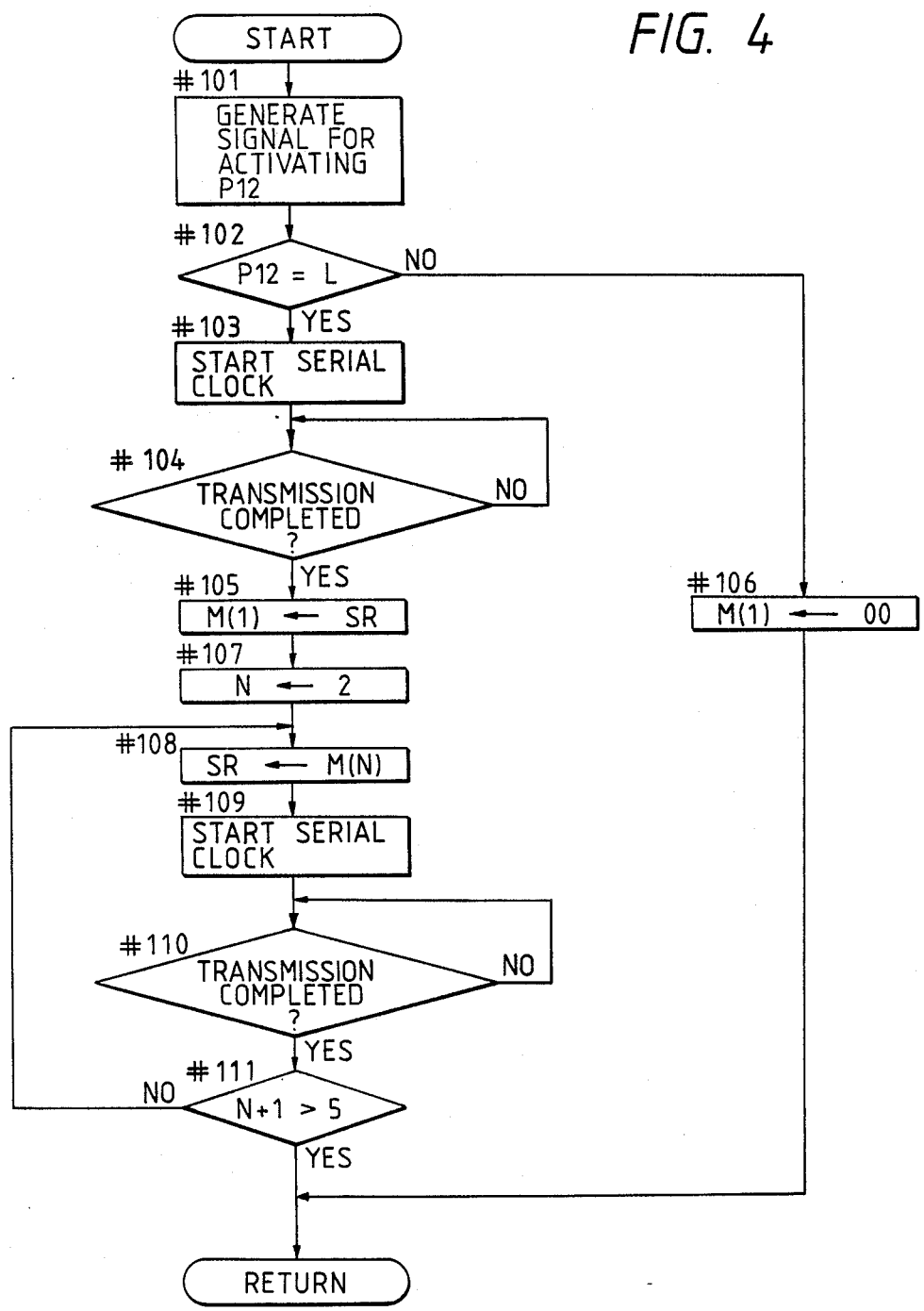

FIG. 10A

| M(4) | SHUTTER DISPLAY |
|---|---|
| 00 | 1 |
| 01 | 2 |
| 02 | 4 |
| 03 | 8 |
| 04 | 15 |
| 05 | 30 |
| 06 | 60 |
| 07 | 125 |
| 08 | 250 |
| 09 | 500 |
| 0A | 1000 |

FIG. 10B

| M(5) | DIAPHRAGM DISPLAY |
|---|---|
| 00 | F 1 |
| 01 | F 1.4 |
| 02 | F 2 |
| 03 | F 2.8 |
| 04 | F 4 |
| 05 | F 5.6 |
| 06 | F 8 |
| 07 | F 11 |
| 08 | F 16 |
| 09 | F 22 |
| 0A | F 32 |

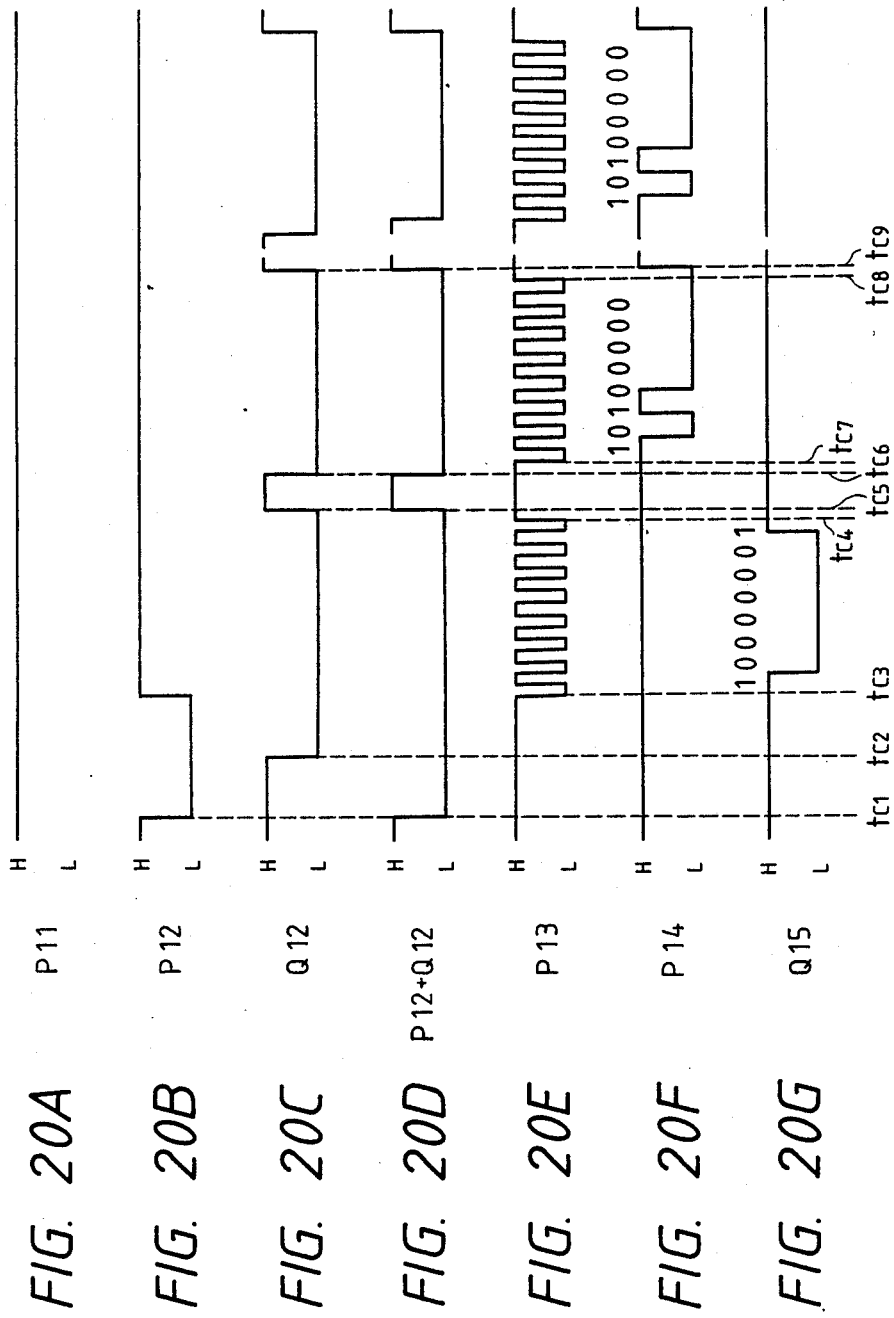

CAMERA

BACKGROUND OF THE INVENTION:

1. Field of the Invention

The present invention relates to a camera, a data printing device (to be referred to as a data back hereinafter) capable of being mounted on the camera and of printing various data on a film loaded in the camera, and a film winding device assembled in the camera.

2. Related Background Art

In a camera system in which a camera and a data back which does not communicate data with the camera are combined to perform a photographing operation, the data back changes a data printing time in accordance with a data printing signal from the camera, a transmission time of which changes depending on a film sensitivity. In this system, since signal processing of the data back is not complicated, if the transmission time of the data printing signal transmitted from the camera to the data back changes, no problem is posed.

Meanwhile, a camera system in which a camera and a data back which communicates data with the camera are combined to perform a photographing operation is also known. A camera system of this type which has various functions realized by serial data communication between a camera and a data back is disclosed in Japanese Patent Laid-Open (Kokai) No. 61-167934.

However, in this system, since signal processing of the data back is complicated, if the transmission time of the data printing signal transmitted from the camera to the data back changes, an erroneous operation may be caused by the change in transmission time.

It is a first object of the present invention to provide a camera which can prevent an erroneous operation when a camera and a data back which does not communicate data with the camera are combined or when a camera and a data back which communicates data with the camera are combined.

The following problem is posed when an inexpensive data back having a data communication function is manufactured. Data which is printed first by the data back is "year, month, and day" data. For this purpose, the data back employs a microcomputer on the basis of oscillation at 32 kHz. However, a microcomputer used in a camera requires high-speed processing, an oscillator of 4 to 8 MHz is employed. When data communication is to be performed between the microcomputers, a data communication speed must be determined in correspondence with a microcomputer having a lower data communication speed. Since a data communication time is about several tens of ms although it varies depending on the number of data, a frame speed tends to decrease, thus posing a problem. Of course, the microcomputer of the data back may be operated at a clock of about 4 to 8 MHz when the camera is activated, and may be operated at a clock of about 32 kHz when the camera is inactivated. In this case, an arrangement is complicated or an expensive microcomputer must be used. It is therefore a second object of the present invention to provide a camera system capable of performing data communication which does not adversely influence a frame speed with an inexpensive arrangement.

A conventional camera with an electric winding device is arranged to perform a film winding operation immediately after exposure of an object for a preset shutter time is completed. When a data back is mounted on the camera and a low-sensitivity film is used, a data printing operation is required for a long period of time. However, when exposure of an object is completed, the data printing operation is interrupted, and a film winding operation is performed. With this sequence, printed data can be prevented from being blurred upon film movement.

However, according to the above technique, although printed data can be prevented from being blurred, the density of the printed data is low due to a short printing time, and cannot often be discriminated. This phenomenon is conspicuous as the shutter time is shorter or a film sensitivity is lower.

It is a third object of the present invention to solve this problem.

SUMMARY OF THE INVENTION

In order to achieve the first object, a camera of the present invention which can receive an accessory for performing a data printing operation on a film surface and can execute data communication with the accessory, includes:

(a) identification means for identifying whether or not the communication is attained between the camera and the accessory, and (b) transmission means for transmitting a printing signal for causing the accessory to start the data printing operation from the camera to the accessory within a predetermined transmission time.

The transmission means changes the transmission time on the basis of the identification result of the identification means.

In order to achieve the second object, a camera of the present invention which can receive an accessory for performing a data printing operation on a film surface and can execute data communication with the accessory, includes:

(a) release means for generating a release signal for starting a photographing operation, (b) transmission means for transmitting data to the accessory during a time interval from the end of the photographing operation to the beginning of the next photographing operation, and (c) control means for, when the accessory performs the data printing operation, enabling the photographing operation after the data communication and for, when the accessory does not perform the data printing operation, enabling the photographing operation before the data communication.

In order to achieve the second object, an accessory of the present invention which is mounted on a camera, communicates data associated with a film frame count with the camera, and can print the data on a film surface, includes:

(a) detection means for detecting a photographing signal generated in every photographing operation of the camera, (b) data reception means for receiving the film frame count data of the camera by communication with the camera, and (c) storage means for storing a frame count corresponding to the film frame count.

When the detection means detects the photographing signal, the storage means stores a value obtained by incrementing the presently stored frame count by one, and when the data reception means receives the data, stores the film frame count data in place of the presently stored frame count.

In order to achieve the third object, a film winding device of the present invention includes:

(a) first timer means for measuring a first time associated with a data printing operation, (b) second timer means for measuring a second time associated with a shutter, (c) logical sum means for receiving a signal output from the first and second timer means, discriminating whether or not both the first and second timer means output completion signals, and changing its output on the basis of the discrimination result, and (d) film winding means for detecting a change in output from the logical sum means to start a film winding operation.

These and other objects and advantages of the present invention will be easily understood from the following detailed description taken in conjunction with the accompanying drawings.

BRIEF DESCRIPTION OF THE DRAWINGS

FIG. 4 is a flow chart of a communication routine of the MCU 10;

FIGS. 10A and 10B are views for explaining contents of 4th and 5th bytes of communication data;

FIG. 20 is a timing chart of communication between the camera the data back;

DETAILED DESCRIPTION OF THE PREFERRED EMBODIMENTS

(1) First Embodiment

Figure 1:
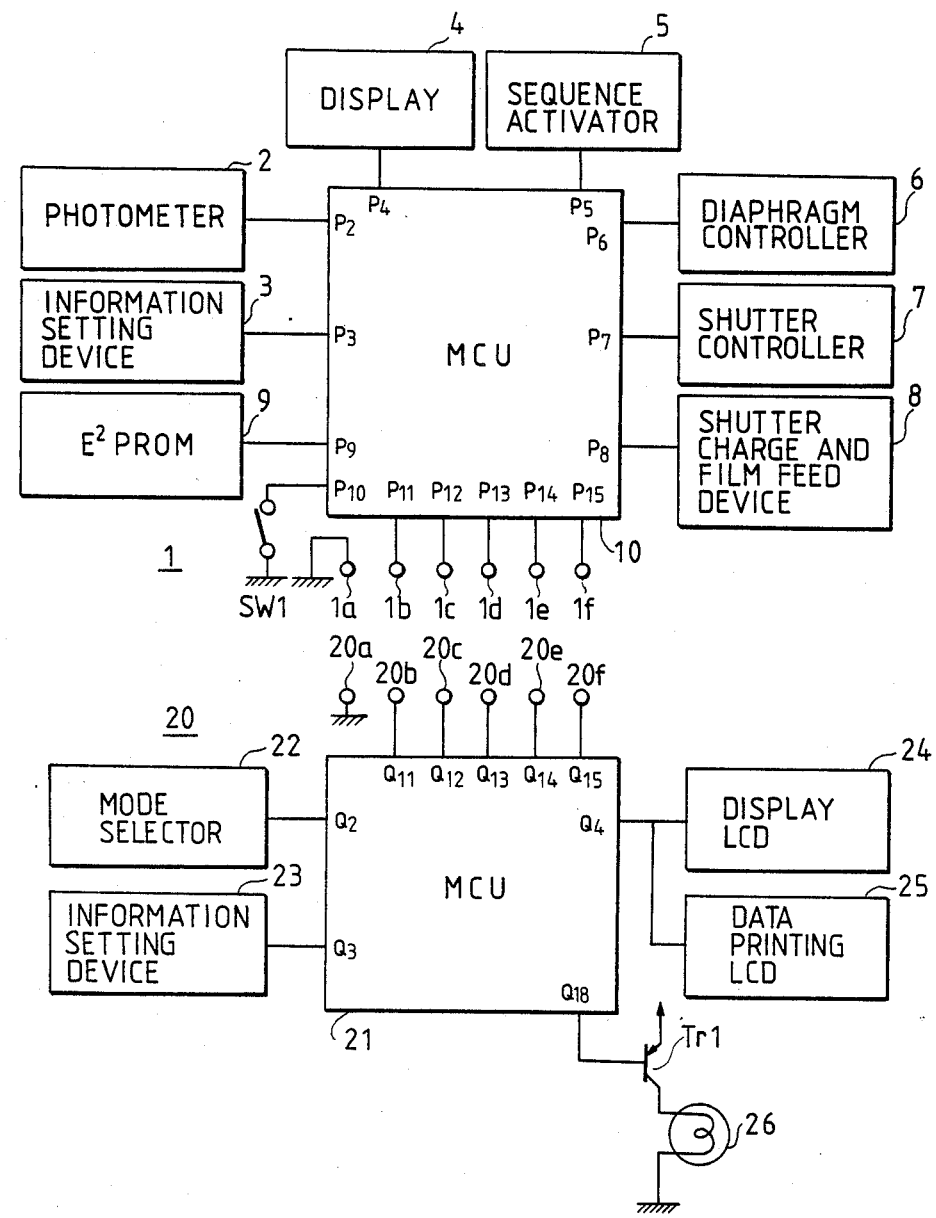
FIG. 1 is a block diagram showing a combination of a camera and a high-performance data back according to a first of the present invention.
Figure 11:
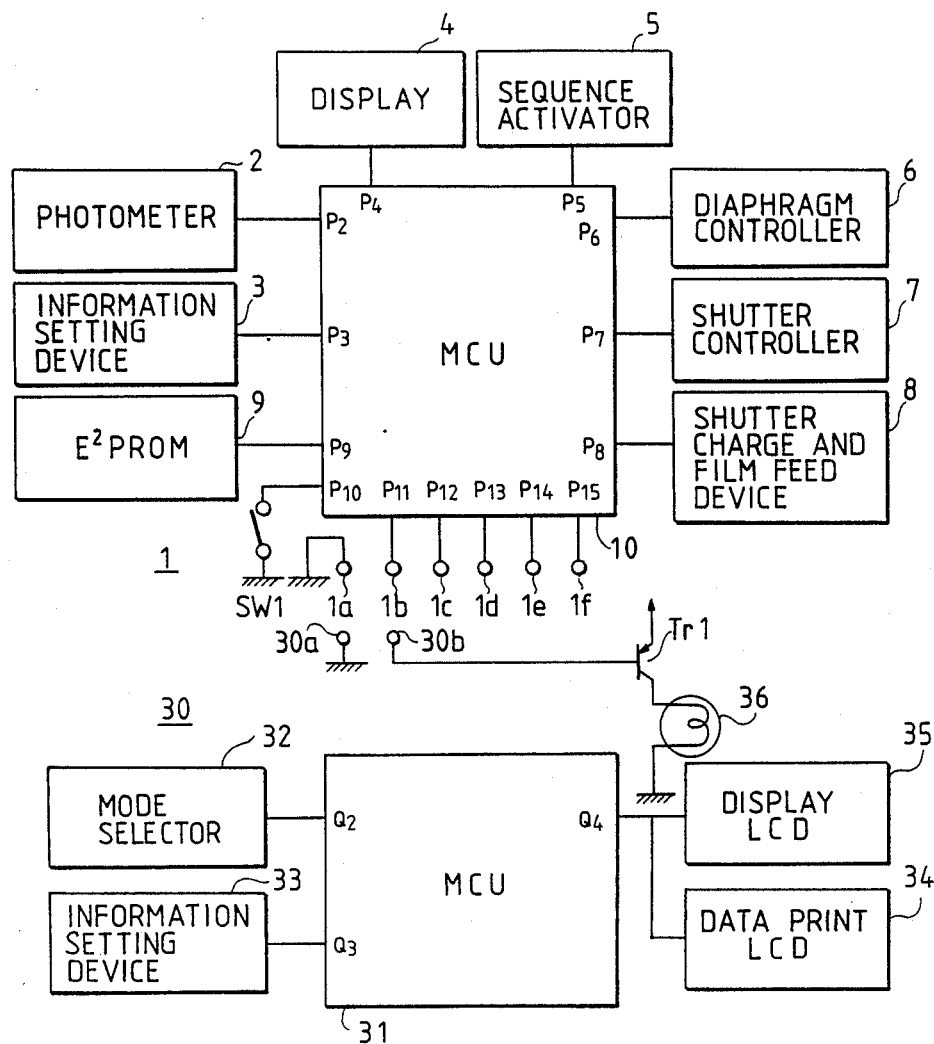
FIG. 11 is a block diagram showing a combination of the camera shown in FIG. 1 and a simplified data back.

FIGS. 1 and 11 are block diagrams of a first embodiment of a camera and an accessory loaded on the camera.

In FIG. 1, a camera 1 receives a detachable accessory 20 (to be referred to as a data back hereinafter) of a high-performance type (i.e., a type capable of communicating data with the camera) capable of printing data. The camera 1 has six contacts 1a to 1f, and the high-performance data back 20 has the same number of contacts 20a to 20f as that of the camera. When the data back 20 is mounted on the camera 1, the contacts having the same suffixes are connected to each other. A microcomputer (to be referred to as an MCU hereinafter) 10 A/D-converts an output from a known photometer 2 into a photometric output. An information-setting device 3 supplies information which can be externally set, e.g., exposure control mode information, preset film sensitivity information, preset shutter speed information; or diaphragm information from a photographing lens, to the MCU 10. A release switch SW1 is normally kept off, and is turned on when a release button (not shown) is depressed. A display 4 displays various exposure information in accordance with an output from the MCU 10. When the release button is depressed and the release switch SW1 is turned on after a predetermined calculation is completed, a sequence-activator 5 is activated by the MCU 10 to start a release sequence. For example, a magnet in the activator 5 is energized to start a mirror-up operation. A diaphragm controller 6 performs automatic diaphragm control in a program exposure control mode or a shutter priority mode. A shutter-controller 7 controls shutter curtains to attain a preset shutter speed or a shutter speed calculated by the MCU 10. A shutter-charge and film-feed device 8 performs a shutter charge operation and winding and rewinding operations of a film after a release operation. An $E^2PROM$ 9 stores necessary data such as data associated with a photographed film frame count after a power switch of the camera is turned off. The MCU 10 performs an apex calculation on the basis of setting by the photometer 2 and the information-setting device 3, and transmits a display output to the display 4. After the release operation, the MCU 10 controls the sequence-activator 5, the diaphragm controller 6, the shutter-controller 7, the shutter-charge and film-feed device 8, the $E^2PROM$ 9, and the like.

When the release button is depressed and the release switch SW1 is turned on, the MCU 10 activates the sequence-activator 5 after it completes the apex calculation. The sequence-activator 5 starts a mirror-up operation. After the sequence-activator 5 is activated, the MCU 10 activates the diaphragm controller 6. When a diaphragm priority mode (to be referred to as an A mode hereinafter) or a manual exposure mode (to be referred to as an M mode hereinafter) is set, the MCU 10 need not generate a diaphragm stop signal, and control is made with a diaphragm value set by a diaphragm ring of a lens. On the other hand, if a program exposure mode (to be referred to as a P mode hereinafter) or a shutter priority mode (to be referred to as an S mode hereinafter) is set, the diaphragm ring of the lens can be turned to a minimum diaphragm position. In this case, the MCU 10 generates a stop signal when a diaphragm value calculated in accordance with the mode is reached, and the diaphragm controller stops the diaphragm of the lens upon reception of this signal. Subsequently, the MCU 10 activates the shutter-controller 7. The shutter-controller 7 starts traveling of a front curtain of the shutter. The shutter-controller 7 starts traveling of a rear curtain after the lapse of a time period corresponding to a shutter speed set by a user if the M mode is set or after the lapse of a time period corresponding to a shutter speed calculated by the MCU 10 if the P, S, or A mode is set.

The high-performance data back 20 comprises a microcomputer (MCU) 21, a mode selector 22, an information-setting device 23, a display LCD 24, a data-printing LCD 25, and a printing lamp 26. Information set by the mode selector 22 or the information-setting device 23 is input to the MCU 21, and the display LCD 24, the data-printing LCD 25, and the printing lamp 26 are driven on the basis of signals from the MCU 21.

TABLE 1

| | Content | Memory of MCU 10 | Memory of MCU 21 | Transmission direction |
|---|---|---|---|---|
| 1st byte | Data back flag | M(1) | DM(1) | 1 ← 20 |
| 2nd byte | Film sensitivity | M(2) | DM(2) | 1 → 20 |
| 3rd byte | Film frame count | M(3) | DM(3) | 1 → 20 |
| 4th byte | Shutter speed information | M(4) | DM(4) | 1 → 20 |
| 5th byte | Diaphragm information | M(5) | DM(5) | 1 → 20 |

The camera 1 and the high-performance data back 20 exchange 5-byte data shown in Table 1. More specifically, after 1st-byte data is transmitted from the high-performance data back 20 to the camera 1, remaining four-byte data are sequentially transmitted from the camera 1 to the high-performance data back 20. The MCU 10 and the MCU 21 have the same numbers of communication memory areas M(1) to M(5) and DM(1) to DM(5), and these memory areas can be expressed as M(N) and DM(N) using a memory pointer N (=1 to 5).

TABLE 2

| Bit | Flag name | Content of flag |
|---|---|---|
| 7 | | Normally 1 as identification |
| 6 | | Undefined (0) |
| 5 | | Undefined (0) |
| 4 | | Undefined (0) |
| 3 | | Undefined (0) |
| 2 | | Undefined (0) |
| 1 | | Undefined (0) |
| 0 | EXPF | 1 when printing is performed |

First-byte data is data back flag information which is transmitted from the high-performance data back 20 to the camera 1. The 1st-byte data has a format defined as shown in Table 2. A bit "7" of this byte is a flag indicating that a data back can perform communication, and is always set to be 1 when communication can be performed. A flag EXPF of a bit "0" is set to be 1 when a state for printing an exposure value controlled by the MCU 10 is set. Thus, data back flag information is set to be $80 (10000000 in binary notation) or $81 (10000001 in binary notation) when an undefined flag is fixed to be 0.

Second-byte data and subsequent data are sent from the camera 1 to the high-performance data back 20. The 2nd-byte data indicates a film sensitivity, and is an SV value set at the camera 1 or read from a DX code. 3rd-byte data indicates a photographed film frame count displayed on the camera 1. When the camera is empty (no film is loaded in the camera), this data is determined to be $0E. 4th- and 5th-byte data indicate shutter speed information and diaphragm information, respectively, and are determined to have the same formats as contents displayed on the camera 1, as shown in FIGS. 10A and 10B.

Figure 2:
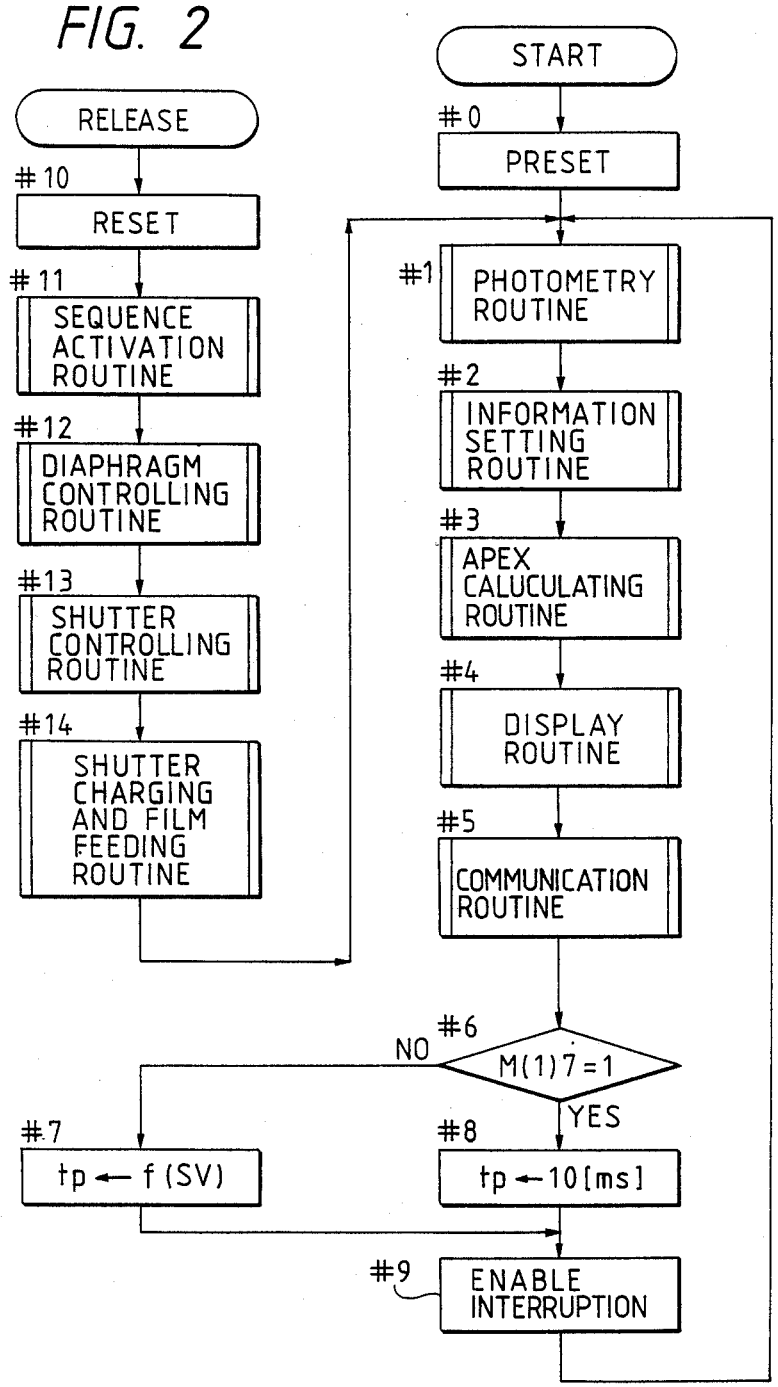
FIG. 2 is a flow chart of the main routine of an MCU 10.

FIG. 2 is a flow chart of the main routine of the MCU 10.

Step #0 is a preset routine executed immediately after the MCU 10 is reset, and various setting operations required immediately after, e.g., release interruption is enabled are performed. A photometry routine is executed in step #1. A photometric output is received from the photometer 2 and is A/D-converted, and the A/D-converted value is stored. In step #2, an information-setting routine is executed, so that an exposure control mode, a DX code of a patrone, various information of a lens, a preset shutter speed, and the like are read from the setting device 3. In step #3, an apex-calculating routine is executed. An exposure calculation is performed on the basis of information read in steps #1 and #2, and a shutter speed and diaphragm value for display and control are determined.

In step #4, a display routine is executed to drive the display 4, thereby performing a predetermined display of, e.g., an exposure value. In step #5, a communication routine shown in FIG. 4 (to be described later) is called, and communication with the data back is performed. In step #6, it is checked if the bit "7" of 1st-byte data M(1) is 1. If YES in step #6, the flow advances to step #8; otherwise, the flow advances to step #7. The flow advances to step #7 when it is determined that the high-performance data back 20 is not mounted (different from the case of FIG. 1). In step #7, a transmission time (tp) of a printing signal to a simplified data back shown in FIG. 11 (i.e., a data back having no function of communication with a camera) is set according to a film sensitivity SV of a film loaded in the camera. The time tp is set to be short when a high-sensitivity film is used, and set to be long when a low-sensitivity film is used. The flow advances to step #8 when communication with the high-performance data back 20 is attained. In step #8, the transmission time tp of the printing signal is set to be 10 ms. Note that the transmission time of the printing signal changes in accordance with a film sensitivity set at the camera when a simplified data back is mounted, as described above, and coincides with an actual data printing time. However, the transmission time is always constant regardless of the film sensitivity set at the camera, and an actual data printing time is determined on the basis of film sensitivity information separately transmitted from the camera to the data back or film sensitivity information set at the data back itself. More specifically, the printing signal of the simplified data back instructs the data back to perform a data printing operation, and controls an actual printing time, while the printing signal of the high-performance data back is a signal for only instructing the data back to perform a data printing operation. When step #7 or #8 is completed, release interruption is enabled in step #9. After step #9, the flow returns to step #1. Thereafter, a state wherein interruption is enable is set.

When a release operation is performed after the interruption is enabled, the flow jumps from step #44 in an interruption processing routine shown in FIG. 3 (to be described later) to step #10 in FIG. 2. In step #10, a stack is cleared. More specifically, the state is changed so that processing can be started from step #11 even in a state of either one of steps #1 to #9 described above. In step #11, sequence-activating routine is executed to activate the sequence-activator 5. The sequence-activator 5 is caused to energize a magnet and the like, thus starting a mirror-up operation. A diaphragm-controlling routine in step #12 is then executed. When the diaphragm of a lens is turned to a predetermined value position, a diaphragm stop magnet of the diaphragm controller 6 is energized to lock the diaphragm. In step #13, a shutter-controlling routine is executed, so that the shutter-controller 7 controls to obtain a predetermined shutter speed. In step #14, a mirror-down, shutter-charging, and film-feeding routine is executed, so that the shutter-charge and film-feed device 8 is operated. Upon completion of this operation, the flow returns to step #1, i.e., again to the photometry routine after the mirror-down operation. The processing is then restarted from the photometry routine in step #1.

Figure 3:
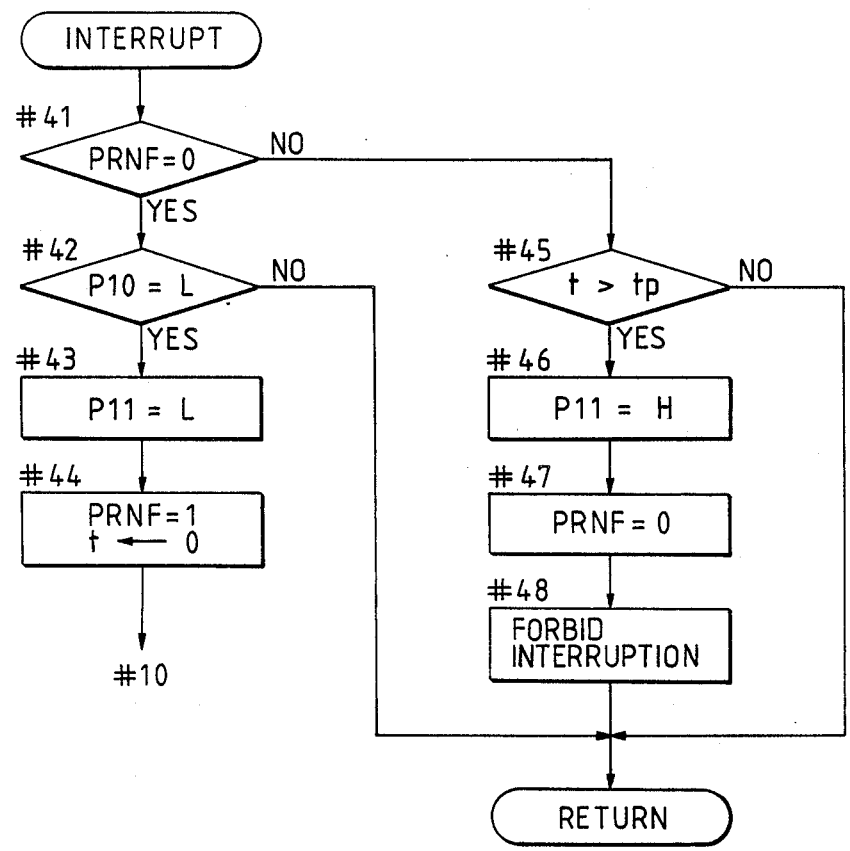
FIG. 3 is a flow chart of a release interruption processing routine of the MCU 10.

FIG. 3 is a flow chart of the release interruption processing routine. After the interruption is enabled in step #9, this routine is executed upon interruption every predetermined period of time (e.g., every 2 ms) while the operations in steps #1 to #9 and #10 to #12 are executed. When this routine reaches a "return" terminal, the flow returns to processing in FIG. 2 before interruption processing. Immediately after power-on, interruption is forbidden, and after interruption is enabled in step #9, this routine can be executed.

When this routine is executed, it is checked in step #41 if a printing flag PRNF in a RAM of the MCU 10 is 0. The printing flag PRNF is set to be 1 when the release operation is started upon depression of a shutter button, and is reset to be 0 after the lapse of a predetermined period of time. This predetermined period of time is a transmission time. If it is determined in step #41 that the flag PRNF is 0, the flow advances to step #42; and if it is determined that the flag PRNF is 1, the flow advances to step #45. The printing flag PRNF is 0 before the release operation is detected, and the flow advances to step #42. In step #42, it is checked if an input terminal P10 is set at L level upon an ON operation of the release switch SW1. If YES in step #42, the flow advances to step #43; otherwise, the flow returns to the main routine, and processing before the interruption processing is restarted. When the release button is depressed and the release switch SW1 is turned on, the terminal P10 is set at L level, and the flow advances to step #43. In step #43, a terminal P11 is set at L level to generate a printing signal (for instructing a data printing operation to the data back) to the high-performance data back 20. In step #44, the printing flag PRNF is set to be 1, and an internal timer of the MCU 10 is reset. This timer measures the transmission time tp of the printing signal transmitted from the camera to the data back. After step #44, the flow jumps to step #10 in the main routine of FIG. 2, and the sequence-activating routine in step #11 is executed. When the interruption processing routine in FIG. 3 is executed during execution of step #11, since the printing flag PRNF is set to be 1 in step #44, as described above, the flow advances from step #41 to step #45. In step #45, a value t of the above-mentioned timer is compared with the predetermined transmission time tp. If the time tp has passed, the flow advances to step #46; otherwise, the flow returns to the main routine, and the processing in FIG. 2 before the interruption processing is restarted. When the predetermined transmission time tp has passed, the flow advances from step #45 to step #46. In step #46, the printing signal terminal P11 is set at H level to stop transmission of the printing signal from the camera to the data back. In step #47, the flag PRNF is set to be 0. In step #48, interruption is forbidden, and the flow returns to the routine in FIG. 2 prior to the interruption processing. Thereafter, the interruption routine in FIG. 3 is not executed until the interruption is enabled again in step #9 in FIG. 2.

FIG. 4 is a flow chart of the communication routine of the MCU 10 which is called as a subroutine in step #5 in FIG. 2.

In step #101, a terminal P12 is set at L level, and is again set at H level after the lapse of a predetermined period of time. To set the terminal P12 at L level means generation of an activating signal for starting data communication between the camera and a mounted data back. If the high-performance data back 20 is mounted, a terminal Q12 of the MCU 21 connected through the contacts 1b and 20b is set at L level in response to the activating signal. However, even if the terminal P12 of the MCU 10 goes to H level after the lapse of the predetermined period of time as described above, it is kept at L level as long as the terminal Q12 of the MCU 21 is at L level.

In step #102, it is checked if an input to the terminal P12 is at L level. If it is determined in step #102 that the terminal P12 is at H Level, the flow advances to step #106; otherwise, the flow advances to step #103. If the high-performance data back 20 is mounted, since the terminal P12 is set at L level, the flow advances to step #103. If the high-performance data back 20 is not mounted, since the terminal P12 never goes to L level, it is set at H level, and the flow advances to step #106. In step #106, the memory M(1) for storing data back flag information is cleared. To check if the terminal P12 is set at L level is equivalent to check if a data back mounted on the camera 1 is a high-performance data back or a simplified data back.

As described above, processing after step #103 is executed only when the high-performance data back 20 is mounted. In steps #103 to #105, processing for receiving data back flag information of a 1st byte from the high-performance data back 20 to the camera 1 is executed. In step #103, transmission of a serial clock from the camera 1 to the data back is started. In step #104, it is waited until a total of a time required until transmission of the 1st-byte signal is completed and a time required until the MCU 21 of the data back is ready for receiving the following 2nd-byte data elapses In step #105, communication data (above-mentioned 1st-byte data) supplied from the high-performance data back 20 and stored in a serial register SR (not shown) of the MCU 10 is stored in the memory M(1) shown in Table 1 of the MCU 10 of the camera.

In steps #107 to #111, processing for transmitting 4-byte data (2nd to 5th bytes) from the camera 1 to the high-performance data back 20 is executed. In step #107, N = 2 is set as a memory pointer of transmission data. In step #108, data in a memory M(N) (film sensitivity of the 2nd-byte data since N = 2 is initially set) of the MCU 10 is transmitted to the serial register SR. In step #109, transmission of a serial clock from the camera to the data back is started. In step #110, the data stored in the serial register SR is transmitted to the MCU 21 of the data back, and it is waited until a total of a time required until the transmission is completed and a time required until the MCU 21 of the data back is ready for receiving data of the following bytes (3rd to 5th bytes) elapses. Subsequently, in step #111, the memory pointer N is incremented by 1. If the memory pointer exceeds 5, the flow returns to the main routine, and the flow advances from step #5 to step #6 in FIG. 2. If the memory pointer is equal to or smaller than 5, the flow returns to step #108. Since N = 3 after the 2nd-byte data is transmitted, the flow returns to step #108, and processing in steps #108 to #111 is repeated. After 5th-byte data is transmitted, since N = 6 in step #111, the flow returns, thus completing the communication subroutine shown in FIG. 4.

Figures 5A, 5B:
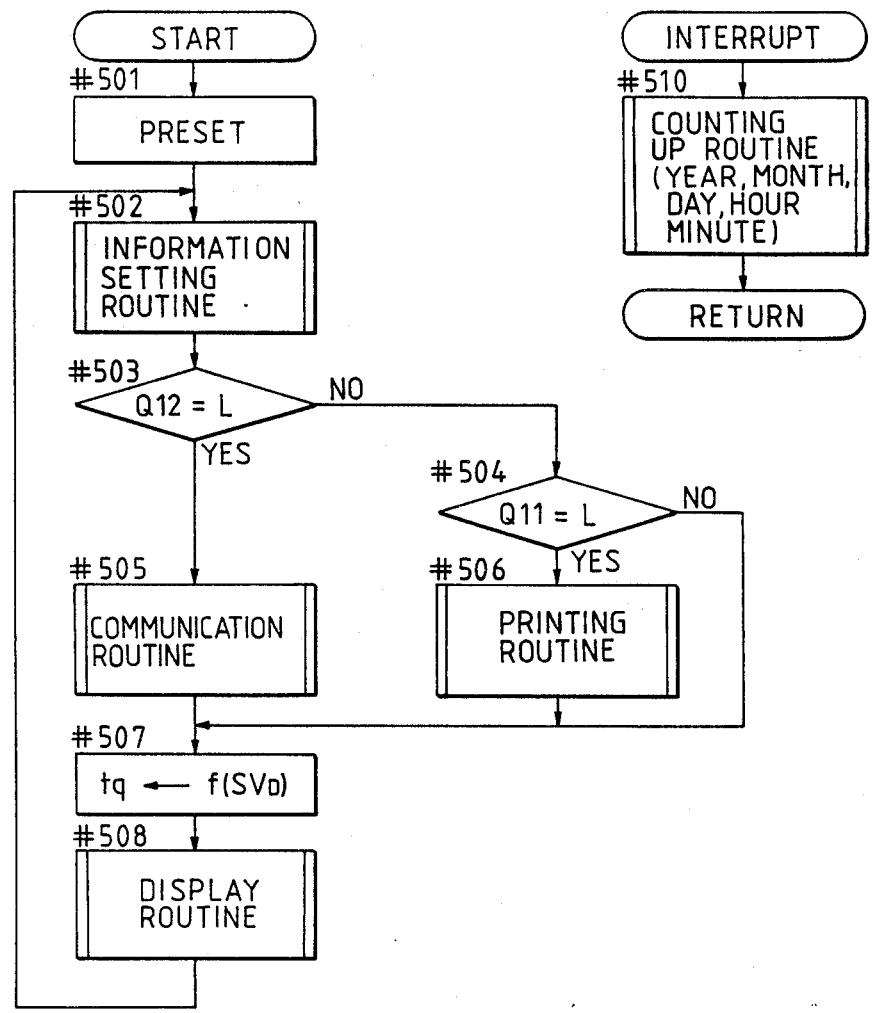
FIG. 5A is a flow chart of the main routine of an MCU 21.
FIG. 5B is a flow chart of an interruption processing routine of the MCU 21.

FIG. 5A is a flow chart of the main routine of the MCU 21 stored in the high-performance data back 20. When the MCU 21 is reset by loading a battery in the data back, preset processing is performed in step #501. After the power switch of the camera 1 is turned off, processing in steps #502 to #508 is repeated. In step #502, an information-setting routine is called, so that setting information of, e.g., setting of a printing mode from the mode selector 22 is read, or data to be printed is corrected in accordance with information from the information-setting device 23.

In step #503, it is checked if the terminal Q12 is at L level. If YES in step #503, the flow advances to step #505; otherwise, the flow advances to step #504. The terminal Q12 is set at L level only when the terminal P12 is set at L level and communication is started from the camera 1. In this case, the flow advances to step #505 to call a communication routine shown in FIG. 6, thus exchanging data with the camera 1. If communication is not started from the camera 1, the terminal Q12 is kept at H level, and the flow advances to step #504. In step #504, it is checked if a terminal Q11 is at L level. If NO in step #504, the flow advances to step #507. The terminal Q11 is set at L level when the release operation is started in the camera 1 and the terminal P11 is set at L level to activate the printing operation. In this case, the MCU 21 calls a printing routine shown in FIG. 7 in step #506, and performs a predetermined data printing operation. Step #507 is executed after steps #504 to #506, and a printing time tq for actually performing an exposure in accordance with a film sensitivity SVD is set. The printing time tq is set to be short when a high-sensitivity film is used, and is set to be long when a low-sensitivity film is used. The film sensitivity SVD is normally set according to the film sensitivity SV (=DM(2)) sent from the camera 1 but does not always coincide with SV since the sensitivity SV is sometimes corrected in correspondence with a special-purpose film. In step #508, data set in step #502, data obtained by communication in step #505, and data which is changed after the printing operation in step #506 are displayed. Upon completion of the processing in step #508, the flow returns to step #502, and the above-mentioned processing is repeated.

FIG. 5B is a flow chart of an interruption routine of the MCU 21 stored in the high-performance data back 20. This routine is activated every minute by an interruption of a timer incorporated in the MCU 21, and year, month, day, hour, and minute data are counted up. When the flow reaches a "return" terminal, processing in FIG. 5A before interruption is restarted.

Figure 6:
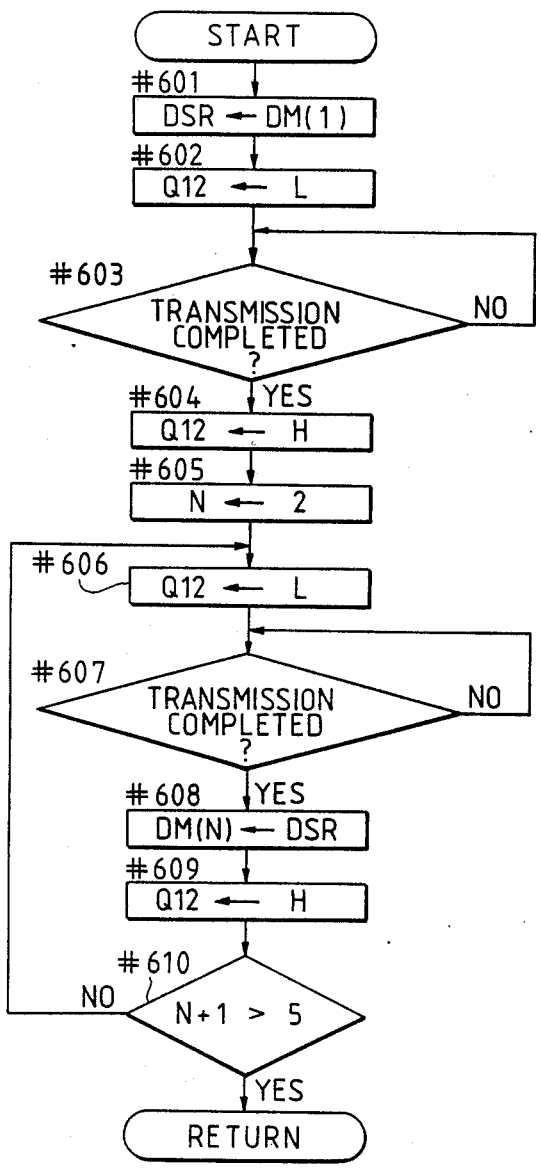
FIG. 6 is a flow chart of a communication routine of the MCU 21.

FIG. 6 is a flow chart of the communication routine of the MCU 21 called in step #505 in FIG. 5A, and corresponds to the communication routine in FIG. 4 of the camera 1.

In step #601, in order to transmit the data back flag information from the high-performance data back 20, data in the memory DM(1) of the MCU 21 is transmitted to a serial register DSR (not shown) of the MCU 21.

In step #602, the terminal Q12 is set at L level to inform to the camera 1 that the transmission preparation is completed. Note that in step #503, the terminal P12 is already set at L level, and even if the terminal P12 goes to H level thereafter, the terminal P12 can be held at L level as long as the terminal Q12 is set at L level. In step #603, processing is repeated until a serial flag is set to be 1. The serial flag is set to be 0 when each byte (8 bits) data begins to be exchanged, and becomes 1 every time eight serial clock pulses from the MCU 10 are counted. When this flag is set to be 1, this means that 1-byte data transmission is completed. When eight serial clock pulses are input from the camera 1, the serial flag is set to be 1, and serial communication of 1-byte data is completed. The flow then advances to step #604. In step #604, the terminal Q12 is set at H level to indicate that the 1-byte communication is completed.

In step #605, the memory pointer N of the memory DM(N) which stores data received from the camera 1 is set to be 2. Thereafter, in step #606, the terminal Q12 is set at L level to inform to the camera 1 that reception preparation is completed. In step #607, processing is repeated until the serial communication is completed as in step #603, i.e., the above-mentioned serial flag is set to be 1. Subsequently, in step #608, the data transmitted to the serial register DSR of the MCU 21 is stored in the memory DM(N) of the MCU 21. In step #609, the terminal Q12 is set at H level to indicate that 1-byte communication is completed. In step #610, the communication memory pointer N is incremented by 1. If N incremented by 1 is equal to or smaller than 5, the flow returns to step #606, and 3-and subsequent byte data are received. If N exceeds 5, the flow returns to the main routine, thus completing this subroutine. The flow then advances to step #507 in FIG. 5A.

Figure 7:
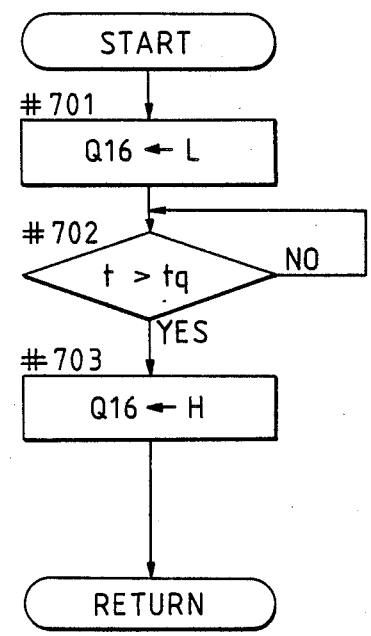
FIG. 7 is a flow chart of a printing routine of the MCU 21.

FIG. 7 is a flow chart of the printing routine of the MCU 21 called in step #506 in FIG. 5A.

In step #701, a terminal Q16 is set at L level to turn on a transistor Tr1, thereby turning on the printing lamp 26. In step #702, it is waited until the printing time tq elapses, and the flow then advances to step #703. In step #703, the terminal Q16 is set at H level to turn off the transistor Tr1, thereby turning off the printing lamp 26. Thus, this subroutine is ended. In this manner, the data printing operation is completed.

Figure 8:
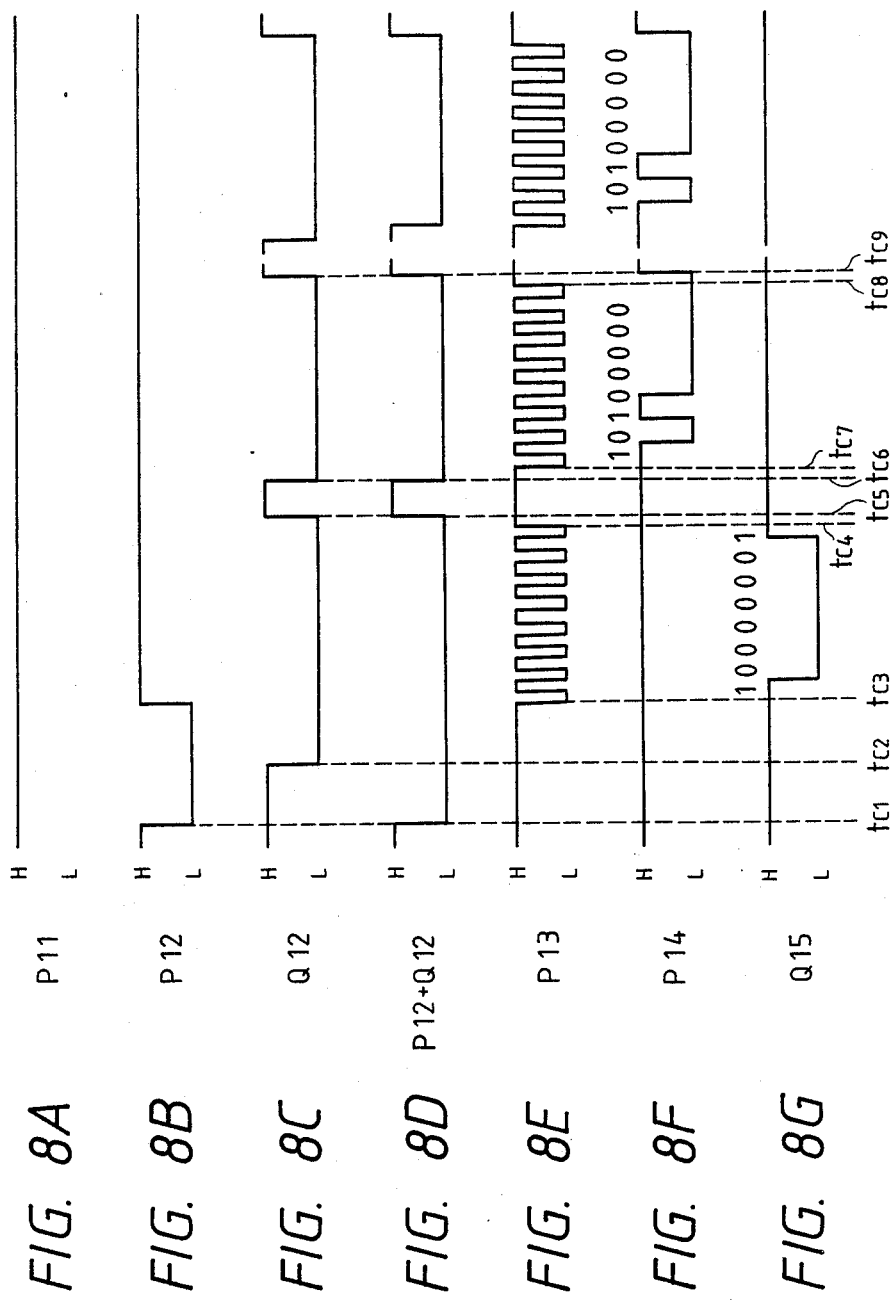
FIG. 8 is a timing chart of communication between the camera and the high-performance data back.

FIG. 8 is a timing chart of communication between the camera 1 and the high-performance data back 20. The operations shown in the flow charts of FIGS. 4 to 6 will be described below with reference to FIG. 8.

When the MCU 10 activates the terminal P12 at time t =tc1 in step #101, the MCU 21 detects this activating signal in step #503 in the loop of step #502, step #503, step #504, step #507, step #508, and step #502, and the flow advances from step #503 to step #505 to execute the communication routine shown in FIG. 6.

The MCU 21 transmits the 1st-byte data DM(1) (=data back flag information) to the serial register DSR of the MCU 21 in step #601 in FIG. 6, and sets the terminal Q12 at L level in step #602 (t =tc2). The MCU 10 is then apt to set the terminal P12 at H level at time t =tc3. The flow then advances to step #102 to check if the terminal P12 is at L level. Since the states of the terminals when the terminals P12 and Q12 are connected through the contacts 1c and 20c are kept at L level under the influence of the terminal Q12, as shown in FIG. 8D, the flow advances from step #102 to step #103, and the MCU 10 starts transmission of the serial clock to the MCU 21 (FIG. 8E). Since a terminal P13 is connected to a serial clock terminal Q13 of the MCU 21 through the contacts 1d and 20d, the data back flag information (1st byte) is output from a serial output terminal Q15 of the MCU 21 in synchronism with this clock. The 1st-byte information $81 (10000001 in binary notation) is output bit by bit from its LSB (least significant bit). This output is transmitted to a serial input terminal P15 of the MCU 10 through the contact 20f of the data back 20 and the contact 1f of the camera 1, and is transmitted bit by bit to the serial register SR of the MCU 10 in synchronism with the serial clock. When eight clock pulses are output from the terminal P13 (t =tc4), 1-byte data transmission is completed. The serial flag of the MCU 21 is set to be 1, and the flow advances from step #603 to step #604 to set the terminal Q12 at H level (t =tc5). In step #605, the memory pointer N is set to be 2, and in step #606, the terminal Q12 is set at L level (t =tc6). In step #607, the serial flag is temporarily set to be 0, and it is then waited until the flag becomes 1.

Meanwhile, the MCU 10 waits for the lapse of a predetermined period of time (a total of a time required until 1st-byte signal transmission is completed and a time required until the MCU 21 of the data back 21 is ready for receiving the 2nd-byte data) in step #104 until the MCU 21 is ready for reception. In this case, a change L→H→L in terminal Q12 can be monitored to assure an operation and to shorten a time. When the flow advances from step #104 to step #105, the data back flag information transmitted to the serial register SR is transmitted to the memory M(1) of the MCU 10. In step #107, the memory pointer N is set to be 2, and data stored in the memory M(N) indicated by the memory pointer is transmitted to the serial register SR of the MCU 10. Since N =2 is initially set, film sensitivity data of a 2nd byte is transmitted to the serial register SR. In step #109, transmission of the serial clock from the MCU 10 to the MCU 21 is started (t =tc7). In step #110, it is waited until transmission of the serial clock is completed and the data back is ready for receiving the next data. If the film sensitivity is IS0100 (SV =5), 00000101 in binary notation is output from a serial clock terminal P14 of the MCU 10 in synchronism with the clock. When eight clock pulses are output (t =tc8), transmission of 1-byte data is completed. The serial flag of the MCU 21 is then set to be 1, and the flow advances from step #607 to step #608. The data transmitted to the serial register DSR of the MCU 21 is transmitted to the memory DM(N) of the MCU 21. Since N =2 is initially set, the film sensitivity information is stored in the memory DM(2) of the MCU 21. Subsequently, in step #609, the terminal Q12 is set at H level (t =tc9). In step #610, the memory pointer N is incremented by 1. If N exceeds 5, the flow returns to the main routine. In this case, since "2" is updated to "3", the flow returns to step #108, and 3rd-byte data is waited. On the other hand, the MCU 10 waits for the lapse of a predetermined period of time in step #110, and in step #111, updates the memory pointer N by 1. If N exceeds 5, the flow returns to the main routine. However, in this case, since "2" is updated to "3", the 3rd-byte data is transmitted. Steps #108 to #111 and steps #606 to #610 are repeated until N =5, and the timing chart shown in FIG. 8 have the same waveforms as those at t =tc6 to tc9. When 5-byte data are transmitted and received, the MCUs 10 and 21 return from the corresponding communication routines, and a series of communication operations are completed.

Figure 9:
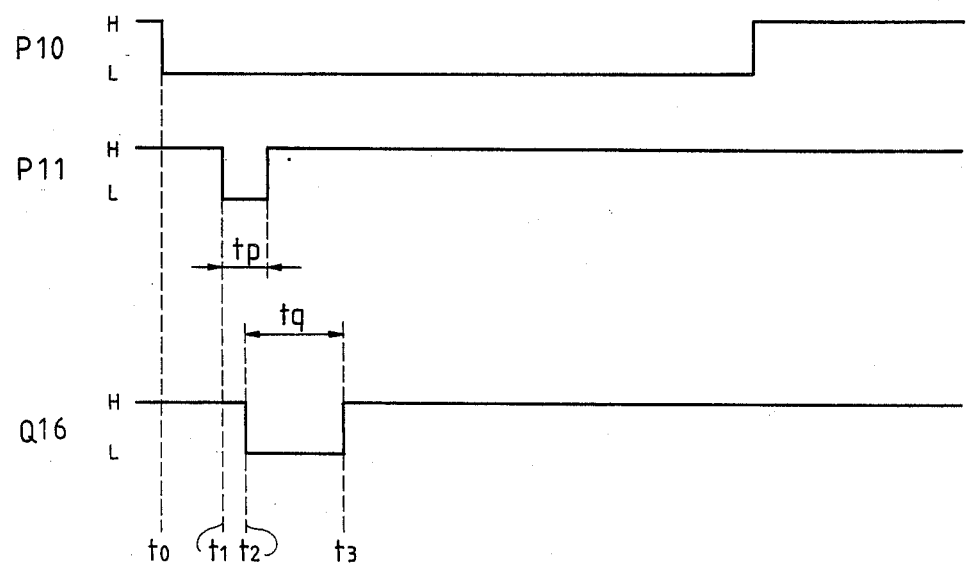
FIG. 9 is a timing chart in a release sequence when the camera is combined with the high-performance data back.

FIG. 9 is a timing chart after the release operation when the camera 1 and the high-performance data back 20 are combined. Before the release operation, the printing flag PRNF is 0, and the interruption routine in FIG. 3 advances like step #41→step #42 →return. When the release button (not shown) of the camera 1 is depressed and the release switch SW1 is turned on, an input terminal P10 of the MCU 10 is changed from H to L level (t =t0). In step #42, this change is detected, and the flow advances to step #43. Thus, the release sequence shown in FIG. 9 is started.

In step #43, the terminal P11 is set at L level to generate the printing signal to the MCU 21 (t =t1). In step #504 in the loop of steps #502 to #508, the MCU 21 detects that terminal Q11 connected to the terminal P11 through the contacts 1b and 20b goes to L level. The flow then advances to step #506, and the printing routine shown in FIG. 7 is executed.

When the printing routine shown in FIG. 7 is executed, the MCU 21 sets the output terminal Q16 at L level in step #701 (t =t2). The transistor Tr1 is then turned on and the printing lamp 26 is turned on. Data displayed on the printing LCD in step #508 is projected onto a film (not shown), thus starting the printing operation. The MCU 21 measures the time tq required for the printing operation in step #702, and the flow then advances to step #703. In step #703, the terminal Q16 is set at H level to turn off the transistor Tr1, so that the printing operation for the printing time tq is completed. In this manner, the printing routine is ended.

The MCU 10 sets the printing flag PRNF to be 1 in step #44 after step #43 and resets its internal timer. The flow then jumps to step #10 in the main routine shown in FIG. 2. In step #10, a stack is cleared, and in step #11, the sequence is activated. In step #12, diaphragm control is performed. Since interruption is kept enabled during execution of these steps, the interruption processing routine shown in FIG. 3 is executed at every predetermined time interval (e.g., 2 ms described above). However, since the printing flag PRNF is 1, the flow advances from step #41 to step #45. In step #45, the lapse time t after the timer is reset in step #44 is compared with the predetermined printing signal transmission time tp. Processing of step #41 →step #45 →return is repeated for a while parallel to the diaphragm control. When the lapse time t after the timer is reset exceeds the predetermined time tp, the flow advances from step #45 to step #46, and the printing signal terminal P11 is set at H level (indicating completion of the printing signal). In step #47, the printing flag PRNF is set to be 0. In step #48, interruption is forbidden, and the flow then returns. Thereafter, the interruption processing routine in FIG. 3 is not executed until interruption is enabled in step #9. When the diaphragm control is completed in step #12, the shutter control is executed in step #13, and the mirror-down, shutter-charging, and film-feeding routine is executed in step #14. Upon completion of step #14, the flow jumps to step #1, and the routine from step #1 described above is executed again.

In FIG. 9, since the high-performance data back 20 is mounted, the bit "7" of the data back flag information (=M(1)) is 1. Therefore, the flow advances from step #6 to step #8 in the main routine of FIG. 2, and the printing signal transmission time tp is set to be 10 ms. This transmission time is shorter than tq =20 ms to 60 ms set by the MCU 21, and the printing operation is performed for the printing time tq set by the MCU 21. If the printing signal transmission time tp is longer than the printing time tq, the data printing operation is performed again after the flow advances to step #507 →step #508 →step #502 →step #503 →step #504 after the printing operation is completed in step #506. In this embodiment, such an operation is never performed. The printing time set by the camera 1 becomes longer than the printing time set by the high-performance data back 20 when a sensitivity is preferably set to be lower than a rated sensitivity according to characteristics of an emulsion of a film to be subjected to printing, i.e., when the film sensitivity selection is switched from an automatic mode to a manual mode. Since the data back performs exposure from the rear surface side of a film, such situation occurs.

FIG. 1 shows the combination of the high-performance data back 20 and the camera 1. FIG. 11 is a block diagram showing a combination of a simplified data back 30 and the camera 1.

The camera 1 is the same as that in the embodiment shown in FIG. 1, and a data back is replaced with a data back 30 of a simplified type. Contacts 30a and 30b of the simplified data back 30 are connected to the contacts 1a and 1b of the camera 1, and only a printing signal is transmitted through these contacts. The simplified data back 30 also has an MCU 31. However, the MCU 31 has a simpler function than that of the MCU 21 of the high-performance data back 20. Since the MCU 31 has no function of serial communication with the camera 1, a printing operation on the basis of data from the camera 1 cannot be performed. However, a basic operation as a data back such as a printing operation of "year, month, and day" data and "hour, minute, and second" data can be performed. A mode selector 32, an information-setting device 33, a display LCD 34, and a data-printing LCD 35 respectively correspond to the mode selector 22, the information-setting device 23, the display LCD 24, and the data-printing LCD 25 but have simplified functions. The printing signal from the camera 1 is received at the contact 30b, and is directly supplied to the base of a transistor Tr1. An ON/OFF operation of a printing lamp 36 is controlled by an ON/OFF operation of the transistor Tr1. Since a printing time is automatically changed in accordance with a film sensitivity set at the camera 1, setting of a film sensitivity at the data back is not required.

Figure 12:
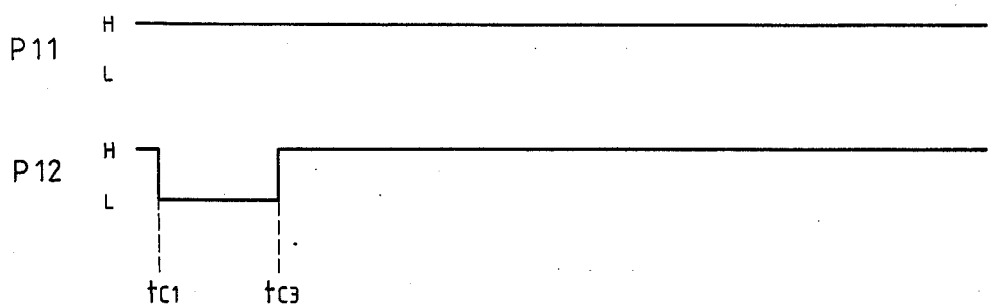
FIG. 12 is a timing chart of communication between the camera and the simplified data back.

FIG. 12 is a timing chart when communication is tried to perform between the camera 1 and the simplified data back 30.

When the MCU 10 activates the terminal P12 at time t =tc1 in step #101, since the MCU 31 has neither a communication function nor a communication terminal, it does not influence the terminal P12. Therefore, the MCU 10 sets the terminal P12 at H level at t =tc3, and the flow advances to step #102 to check if the terminal P12 is at L level. Unlike in FIG. 9, since the terminal P12 is at H level, the flow advances to step #106. In step #106, the data back flag memory M(1) is cleared to 0, and the MCU 10 returns from the communication routine, thus completing a series of communication routine. In this case, data "0" is stored as the data back flag M(1). More specifically, a message indicating that communication cannot be performed with the data back is stored in the memory.

When the flow advances from step #5 to step #6 in the main routine of FIG. 2, the memory M(1) is cleared, and the bit "7" is 0, and hence, the flow advances to step #7. In step #7, a time of 20 ms to 60 ms is set as the printing time tp on the basis of the film sensitivity SV set at the camera 1, and interruption is enabled in step #9.

Figure 13:
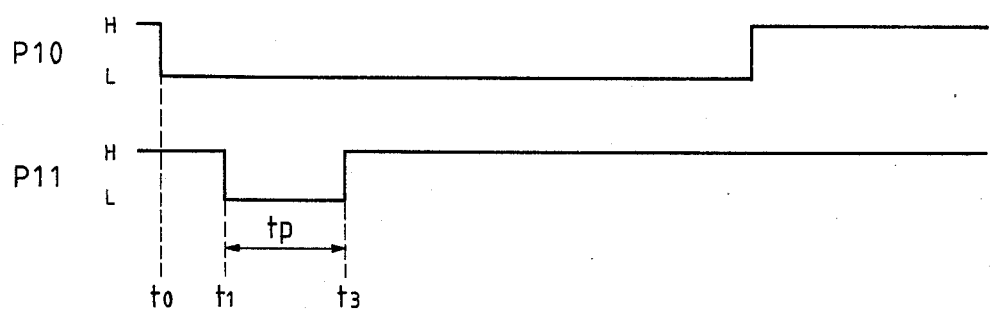
FIG. 13 is a timing chart in a release sequence when the camera is combined with the simplified data back.

FIG. 13 is a timing chart after the release operation when the camera 1 and the simplified data back 30 are combined. Before the release operation, the printing flag PRNF is 0, and the interruption routine shown in FIG. 3 advances to step #41 → step #42 → return. When the release button (not shown) of the camera 1 is depressed and the release switch SW1 is turned on, the input terminal P10 of the MCU 10 is changed from H to L level (t =t0). This change is detected in step #42, and the flow advances to step #43, thus starting the release sequence shown in FIG. 13.

In step #43, the terminal P11 is set at L level to generate the printing signal to the simplified data back 30 (t =t1). The transistor Tr1 whose base is connected to the terminal P11 through the contacts 1b and 30b is then turned on, and the printing lamp 36 is turned on. Data displayed on the data-printing LCD 35 by the MCU 31 is projected onto a film (not shown), thus starting the printing operation.

Meanwhile, the MCU 10 sets the printing flag PRNF in step #44 after step #43, and resets the timer for measuring the transmission time. The flow then jumps to step #10 in the main routine of FIG. 2. In step #10, a stack is cleared. In step #11, the sequence-activating routine is executed. In step #12, the diaphragm-controlling routine is executed. During execution of these steps, since the interruption is kept enabled, the interruption processing routine shown in FIG. 3 is executed at predetermined time intervals. However, since the printing flag PRNF is 1, the flow advances from step #41 to step #45. In step #45, the time t measured by the timer for measuring the printing signal transmission time is compared to the predetermined transmission time tp which changes according to a film sensitivity. Processing of step #41 →step #45 →return is repeated for a while parallel to the diaphragm control. When the time t measured by the timer exceeds the predetermined time tp, the flow advances from step #45 to step #46, and the printing signal terminal P11 is set at H level. In step #47, the printing flag PRNF is set to be 0. In step #48, the interruption is forbidden, and the flow then returns to the main routine. Thereafter, the interruption processing routine shown in FIG. 3 is not executed until the interruption is enabled in step #9. When the diaphragm control is completed in step #12, the shutter control is executed in step #13. In step #14, the shutter-charging and film-feeding routine is executed. Upon completion of step #14, the flow jumps to step #1, and the routine after step #1 is restarted.

In FIG. 13, the printing signal transmission time set at the camera 1 is used as the printing time tp, and the data printing operation is performed according to this printing time tp. Since the printing time tp changes within the range of 20 ms to 60 ms according to a film sensitivity, the data back need not perform setting. However, when the printing time is to be manually changed like in the high-performance data back, the time is left unchanged.

According to the first embodiment of the present invention, a data back having a communication function can be discriminated from a data back having no communication function, and a printing signal transmission time suitable for the discriminated data back is set in the data back, thus allowing optimal control.

(2) Second Embodiment

A camera and an accessory according to a second embodiment have the same structures as those of the camera and the accessory shown in FIG. 1. The contents of programs set in microcomputers (MCUs) 10 and 21 of the camera and the accessory according to the second embodiment are different from those in the first embodiment.

Figure 14:
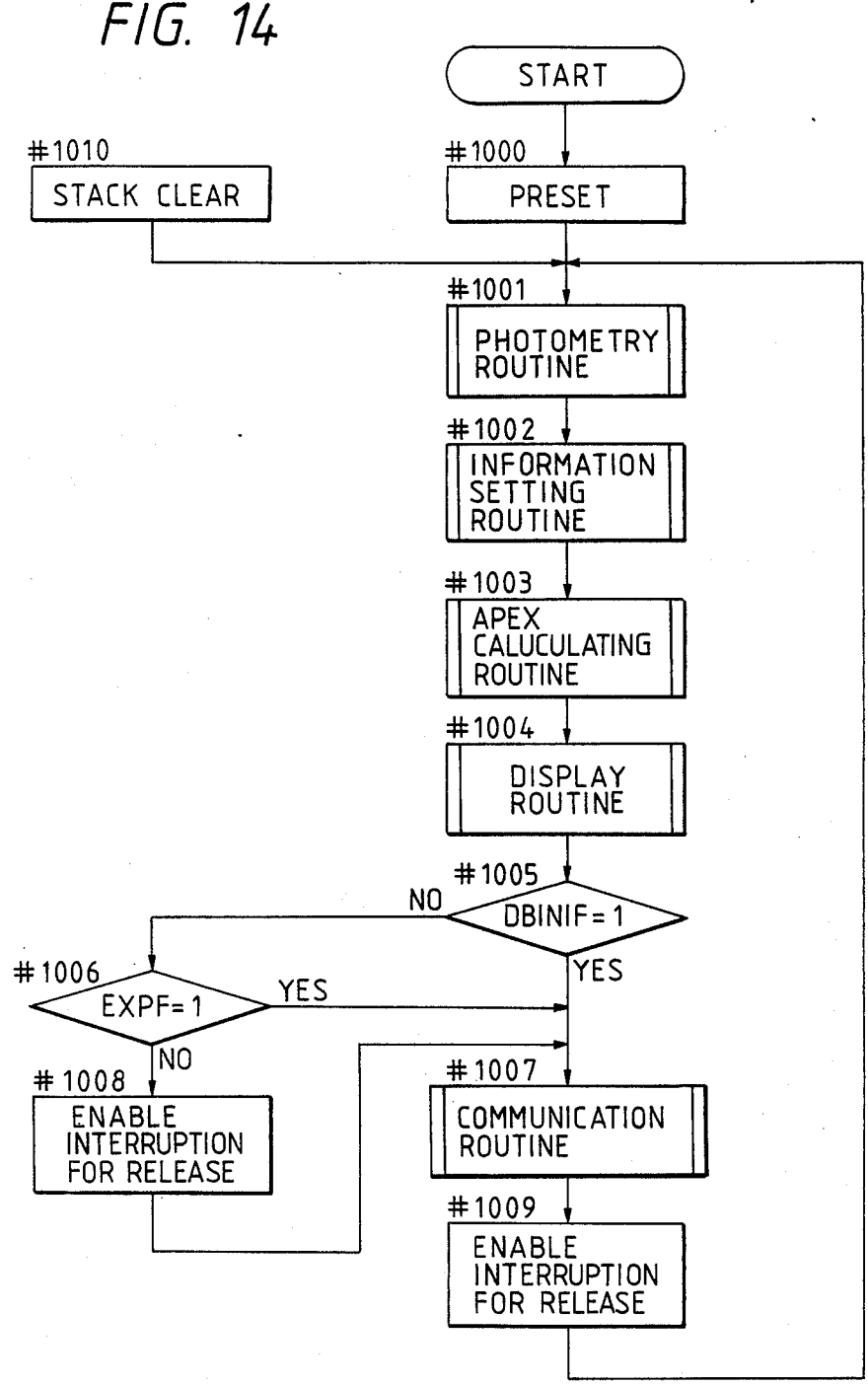
FIG. 14 is a flow chart of a main routine of an MCU 10 of a camera according to a second embodiment.

FIG. 14 is a flow chart of a main routine of the MCU 10. Step #1000 is a preset routine executed only immediately after a reset operation. In this routine, interruption for release (or release interruption) is forbidden, and a flag DBINIF indicating that communication with a data back is not yet performed is set to be 1. In step #1001, a photometry routine is executed, so that an A/D-converted value of a photometric output from a photometer 2 is read. In step #1002, an information-setting routine is executed, so that an exposure control mode, a DX code on a patrone, various information of a lens, a preset shutter speed, and the like are read from an information-setting device 3. In step #1003, an apex-calculating routine is executed, so that a calculation is performed on the basis of information read in steps #1001 and #1002 to obtain a shutter speed and a diaphragm value for display and control. In step #1004, a display routine is executed to drive a display 4, thus performing a predetermined display. It is then checked in step #1005 if the flag DBINIF is 0. The flag DBINIF is 1 immediately after the reset operation. Thus, a communication routine in step #1007 is executed, and the flow advances to step #1009. Once a camera communicates with a data back 20, the flag DBINIF is set to be 0. Thus, the flow advances from step #1005 to step #1006 to check if a flag EXPF =1. If YES in step #1006, the flow advances to step #1007, and the communication routine is executed in step #1007. However, if NO in step #1006, the flow advances to step #1008, and the release interruption is enabled. Thereafter, the communication routine is executed in step #1007. The release interruption is enabled in step #1009 after step #1007 since the flow may advance to step #1007 without going through step #1008. When the flag DBINIF is 1, since no communication is executed with the data back 20, communication must be executed before the release interruption is enabled. Once the communication is executed, the flag DBINIF is always 0 even immediately after the release operation. Thus, whether or not the release interruption is enabled can be determined on the basis of the flag EXPF. In an exposure value printing mode, new display data after the photometry routine is executed again after the release operation is required. Therefore, the data back 20 sets the flag EXPF =1 so that the release interruption is enabled after the communication. After step #1009, the flow returns to step #1001. After the release operation, when the release routine is completed, the flow jumps to step #1010. In step #1010, a stack is cleared, and interruption is forbidden to set the same state as that after the processing in step #1000. Thereafter, processing is restarted from the photometry routine in step #1001.

Figure 15:
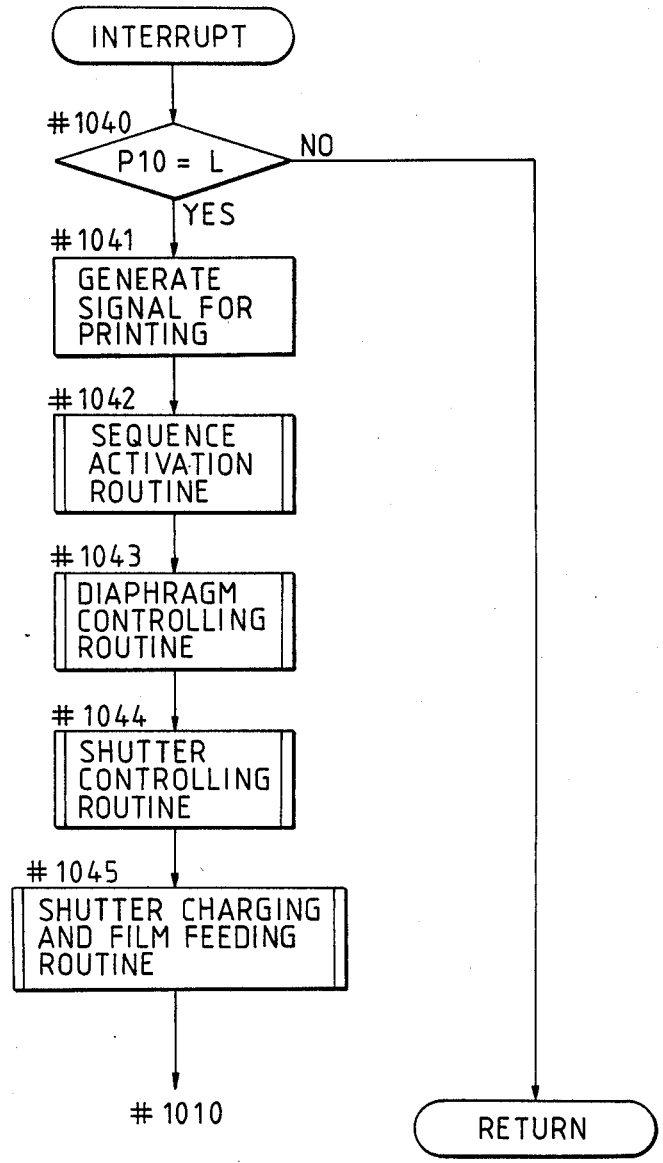
FIG. 15 is a flow chart of a release interruption routine of the MCU 10.

FIG. 15 is a flow chart of the release interruption routine. After the interruption is enabled, this routine is executed at predetermined time intervals (e.g., 2 ms). Immediately after power-on, interruption is forbidden, and can be executed after the release interruption is enabled in step #1008 or #1009.

When this routine is executed, it is checked in step #1040 if an input terminal P10 is set at L level. If YES in step #1040, the flow advances to step #1041; otherwise, the flow returns to the main routine and processing before interruption processing is restarted. When a release button is depressed and a release switch SW1 is turned on, the terminal P10 is set at L level, and the flow advances to step #1041. In step #1041, a terminal P11 is set at L level to generate to a printing signal to the data back 20. After the lapse of a time for allowing a response from the data back 20, the terminal P11 is reset at H level. In step #1042, a sequence-activating routine is executed to activate a sequence-activator 5, so that a magnet and the like are energized, thus starting a mirror-up operation. A diaphragm-controlling routine in step #1043 is then executed. When a diaphragm of a lens is stopped down by a predetermined amount, a diaphragm stop magnet is energized to lock the diaphragm. In step #1044, a shutter-controlling routine is executed to obtain a predetermined shutter speed. In step #1045, a shutter-charging & film-feeding routine is executed. Thereafter, the flow returns to step #1001 in the main routine of FIG. 14, i.e., again to the photometry routine after the mirror-down operation.

Figure 16:
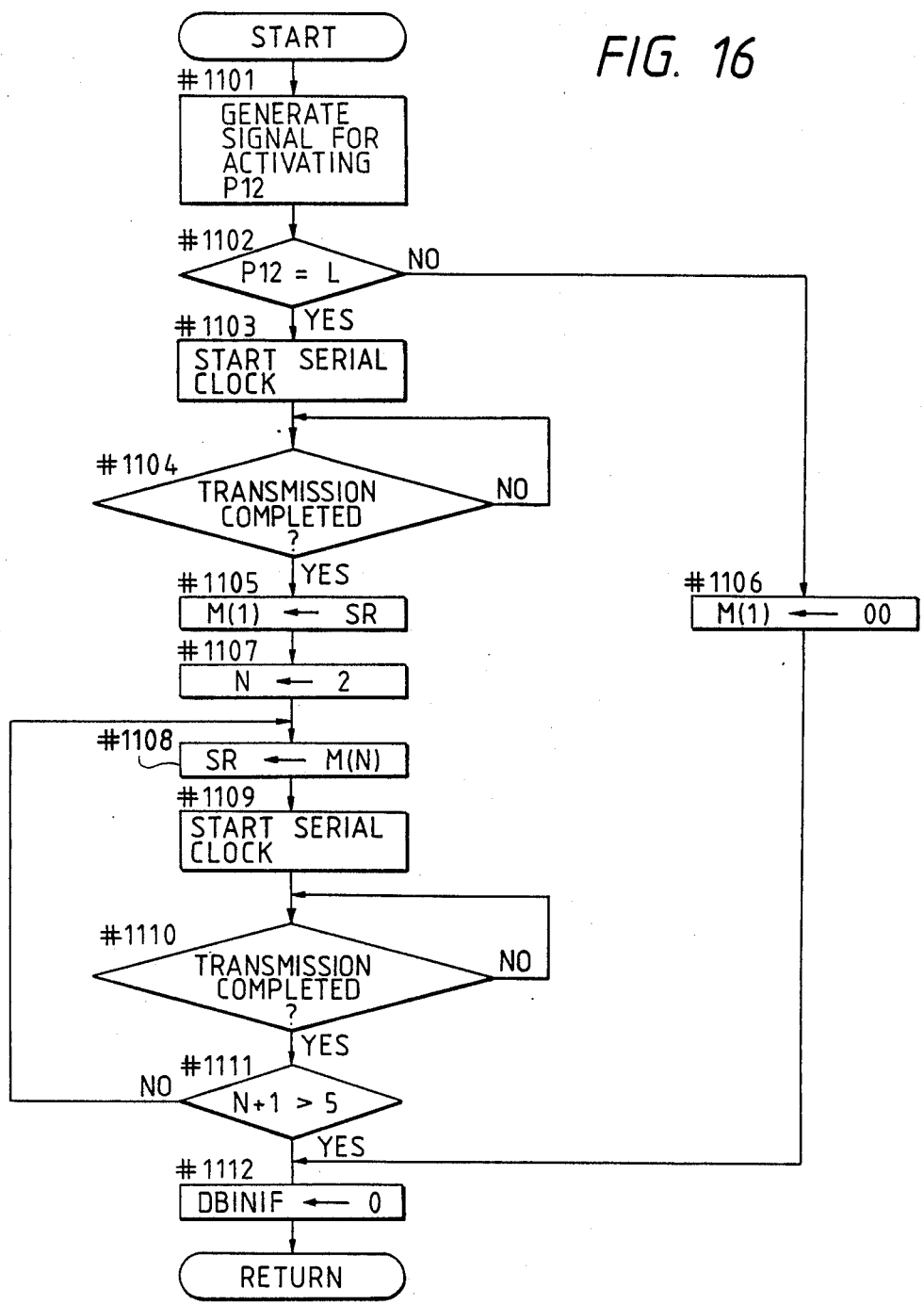
FIG. 16 is a flow chart of a communication routine of the MCU 10.

FIG. 16 is a flow chart of a communication routine of the MCU 10 which is called as a subroutine in step #1007 in FIG. 14.

In step #1101, the terminal P12 is set at L level, and is then reset to H level after the lapse of a predetermined period of time. To set the terminal P12 at L level means to activate a mounted data back. If the data back is mounted, a terminal Q12 connected to the terminal P12 through contacts lb and 20b goes to L level in response to the activation. Even if the terminal P12 is to be set at H level after the lapse of the predetermined period of time, it is kept at L level as long as the terminal Q12 is at L level.

In step #1102, it is checked if an input to the terminal P12 is at L level. If NO in step #1102, the flow advances to step #1106; otherwise, the flow advances to step #1103. If the data back 20 is mounted, since the terminal P12 is set at L level, the flow advances to step #1103. If the data back 20 is not mounted, since the terminal P12 never goes to L level, the terminal P12 is set at H level, and the flow advances to step #1106.

Thus, processing after step #1103 is executed when the data back 20 is mounted. In steps #1103 to #1105, processing for receiving 1st-byte data back flag information from the data back 20 to a camera 1 is performed. In step #1103, a serial clock is started, and the lapse of a predetermined period of time is waited in step

1104. More specifically, the lapse of a time until a serial flag is set to be 1 to indicate completion of transmission and storage of transmitted data in a memory of the data back 20 is waited. In step #1105, communication data supplied from the data back 20 and stored in a serial register SR of the MCU 10 is stored in a memory M(1).

In steps #1107 to #1111, processing for transmitting 4-byte data from the camera 1 to the data back 20 is executed. In step #1107, N =2 is set as a memory pointer of transmission data. In step #1108, data in a memory M(N) of the MCU 10 is transmitted to the serial register SR. In step #1109, a serial clock is started. In step #1110, the lapse of a predetermined period of time is waited until the serial transmission is completed. That is, the lapse of a time until the serial flag is set to be 1 to indicate completion of reception and transmission of the next data from the data back 20 to a serial register of the MCU 21 is waited. In step #1111, a memory pointer N is incremented by 1. If N exceeds 5, the flow advances to step #1112. If N is equal to or smaller than 5, the flow returns to step #1108. After the 1st-byte data is transmitted, since N =3, the flow returns to step #1108, and processing in steps #1108 to #1111 is repeated. After 4th-byte data is transmitted, since N =6 in step #1111, the flow then advances to step #1112.

Step #1112 is executed after step #1106 or #1111. In step #1112, the flag DBINIF indicating that communication is performed once is set to be 0, thus ending the communication subroutine shown in FIG. 16.

Figures 17A, 17B:
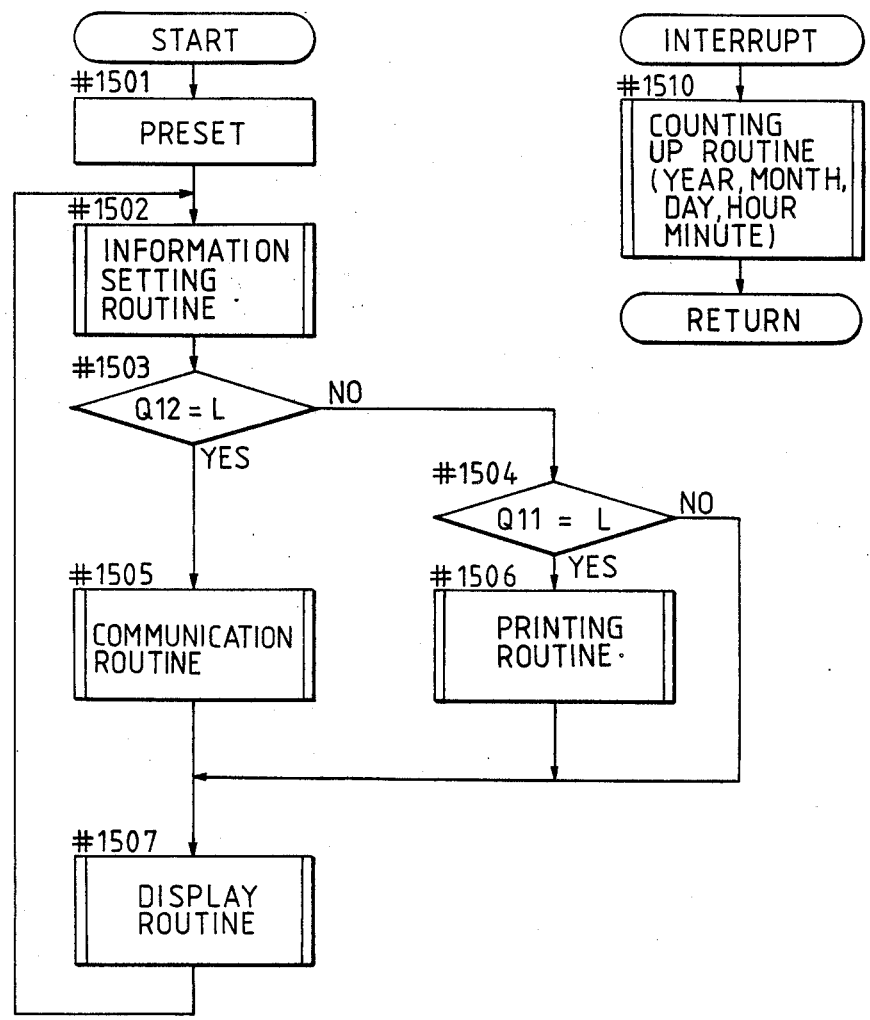
FIG. 17A a flow chart of the main routine of an MCU 21 of a data back according to the second embodiment.
FIG. 17B is a flow chart of an interruption processing routine of the MCU 21.

FIG. 17A is a flow chart of a main routine of the MCU 21 stored in the data back 20. In step #1501, a preset operation after a battery is inserted is performed. In general, after the power switch of the camera 1 is turned off, processing in steps #1502 to #1507 is repeated. In step #1502, an information-setting routine is called as a subroutine, so that setting of a printing mode is read from a mode selector 22 or data to be printed is corrected according to information from the information-setting device 23.

It is checked in step #1503 if the terminal Q12 is at L level. If YES in step #1503, the flow advances to step #1505; otherwise, the flow advances to step #1504. The terminal Q12 is set at L level when the camera 1 activates communication to set the terminal P12 at L level. In this case, the flow advances to step #1505 to call the communication routine shown in FIG. 18, thus exchanging data with the camera 1. If the camera 1 does not activate communication, the terminal Q12 is kept at H level, and the flow advances to step #1504. It is checked in step #1504 if the terminal Q11 is at L level. If NO in step #1504, the flow advances to step #1507. The terminal Q11 is set at L level when the camera 1 executes the release routine and sets the terminal P11 to activate the printing operation. In this case, the MCU 21 calls the printing routine shown in FIG. 19 in step #1506, and performs printing of predetermined data. Step #1507 is executed after steps #1504 to #1506, so that data set in step #1502, data obtained by communication in step #1505, and data which changes after the printing operation in step #1506 are displayed. Upon completion of the processing in step #1507, the flow returns to step #1502, and the above-mentioned processing is repeated.

FIG. 17B is a flow chart of an interruption routine of the MCU 21 stored in the data back 20. This routine is activated every minute by an interruption of a timer incorporated in the MCU 21, and "year, month, day, hour, and minute" data are counted up.

Figure 18:
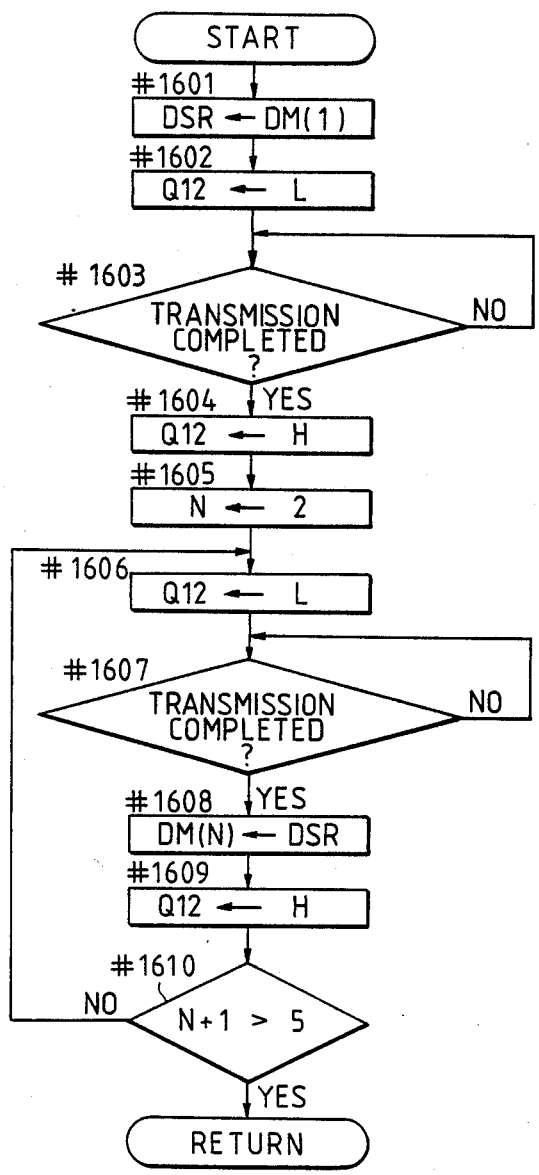
FIG. 18 is a flow chart of a communication routine of the MCU 21.

FIG. 18 is a flow chart of the communication routine of the MCU 21 called in step #1505 in FIG. 17A, and corresponds to the communication routine of the camera shown in FIG. 16.

In step #1601, in order to transmit data back flag information from the data back 20, data in a memory DM(1) of the MCU 21 is transmitted to a serial register DSR of the MCU 21.

In step #1602, the terminal Q12 is set at L level to inform to the camera 1 that transmission preparation is completed. In step #1603, processing is repeated until the serial flag becomes 1. When eight serial clock pulses are input from the camera 1, the serial flag is set to be 1 (serial communication is completed), and the flow advances to step #1604. In step #1604, the terminal Q12 is set at H level to indicate that 1-byte communication is completed.

In step #1605, "2" is set as the memory pointer N of a memory storing data to be transmitted to the camera 1. In step #1606, the terminal Q12 is set at L level to inform to the camera 1 that reception preparation is completed. In step #1607, processing is repeated until serial communication is completed as in step #1603. In step #1608, data transmitted to the serial register DSR of the MCU 21 is stored in a memory DM(N) of the MCU 21. In step #1609, the terminal Q12 is set at H level to indicate that 1-byte communication is completed. In step #1610, the communication memory pointer N is incremented by 1. If N exceeds 5, the flow returns to end this subroutine. If N is equal to or smaller than 5, the flow returns to step #1606.

Figure 19:
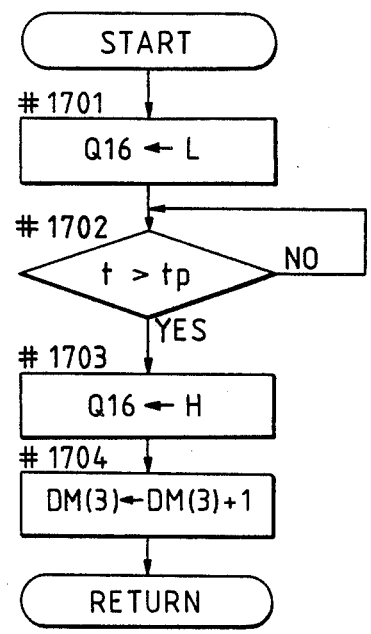
FIG. 19 is a flow chart of a printing routine of the MCU 21.

FIG. 19 is a flow chart of the printing routine of the MCU 21 called in step #1506 in FIG. 17A.

In step #1701, a terminal Q16 is set at L level to turn on a transistor Tr1, thus turning on a printing lamp 26. In step #1702, the lapse of a printing time tp is waited, and the flow then advances to step #1703. In step #1703, the terminal Q16 is set at H level to turn off the transistor Tr1, thereby turning off the printing lamp 26. Subsequently, in step #1704, the content of a memory DM(3) for storing frame count data for the printing operation is incremented by one, and this subroutine is ended.

FIG. 20 is a timing chart of communication between the camera 1 and the data back 20. The operations shown in the flow charts of FIGS. 16 to 18 will be described below with reference to FIG. 20.

When the MCU 10 activates the terminal P12 at time t =tc1 in step #1101, the MCU 21 detects this activating signal in step #1503 in the loop of step #1502, step #1503, step #1504, step #1507, and step #1502, and the flow advances from step #1503 to step #1505 to execute the communication routine shown in FIG. 18.

The MCU 21 transmits the 1st-byte data DM(1) (=data back flag information) to the serial register of the MCU 21 in step #1601 in FIG. 18, and sets the terminal Q12 at L level in step #1602 (t =tc2). The MCU 10 sets the terminal p12 at H level at time t =tc3. The flow then advances to step #1102 to check if the terminal P12 is at L level. The states of the terminals when the terminals P12 and Q12 are connected through the contacts 1c and 20c are kept at L level under the influence of the terminal Q12, as shown in FIG. 20D. The flow advances from step #1102 to #1103, and transmission of the serial clock is started (FIG. 20E). Since a terminal P13 is connected to a serial clock terminal Q13 of the MCU 21 through contacts 1d and 20d, the 1st-byte data back flag information is output bit by bit from its LSB from a serial output terminal Q15 of the MCU 21 in synchronism with this clock. This output is transmitted to a serial input terminal P15 of the MCU 10 through the contact 20f of the data back 20 and the contact 1f of the camera 1, and is transmitted bit by bit to the serial register SR of the MCU 10 in synchronism with the serial clock. When eight clock pulses are output from the terminal P13 (t =tc4), 1-byte data transmission is completed. The serial flag of the MCU 21 is set to be 1, and the flow advances from step #1603 to step #1604 to set the terminal Q12 at H level (t =tc5). In step #1605, the memory pointer N is set to be 2, and in step #1606, the terminal Q12 is set at L level (t =tc6). In step #1607, it is then waited until the flag becomes 1.

Meanwhile, the MCU 10 waits for the lapse of a predetermined period of time in step #1104 until the MCU 21 is ready. In this case, a change L→H→L in terminal Q12 can be monitored to assure an operation and to shorten a time. The flow advances from step #1104 to step #1105, and the data back flag information transmitted to the serial register SR is transmitted to a memory M(1) of the MCU 10. In step #1107, the memory pointer N is set to be 2, and data stored in the memory M(N) indicated by the memory pointer is transmitted to the serial register SR of the MCU 10. Since N =2 is initially set, film sensitivity data of a 2nd byte is transmitted to the serial register SR. In step #1109, transmission of the serial clock is started (t =tc7). In step #1110, it is waited until serial transmission is completed. If the film sensitivity is IS0100 (SV =5), 00000101 in binary notation is output from its LSB from a serial clock terminal P14 of the MCU 10 in synchronism with the clock. When eight clock pulses are output (t =tc8), transmission of 1-byte data is completed. The serial flag of the MCU 21 is then set to be 1, and the flow advances from step #1607 to step #1608. The data transmitted to the serial register DSR of the MCU 21 is transmitted to the memory DM(N) of the MCU 21. Since N =2 is initially set, the film sensitivity information is stored in a memory DM(2) of the MCU 21. Subsequently, in step #1609, the terminal Q12 is set at H level (t =tc9). In step #1610, the memory pointer N is incremented by 1. If N exceeds 5, the flow returns to the main routine. In this case, since "2" is updated to "3", the flow returns to step #1108, and 3rd-byte data is waited. On the other hand, the MCU 10 waits for the lapse of a predetermined period of time in step #1110, and in step #1111, increments the memory pointer N by 1. If N exceeds 5, the flow returns to the main routine. However, in this case, since "2" is updated to "3", the flow returns to step #1108. Thus, the 3rd-byte data is transmitted. Steps #1108 to #1111 and steps #1606 to #1610 are repeated until N =5, and the timing chart shown in FIG. 20 has the same waveforms as those at t =tc6 to tc9. Upon completion of transmission/reception of a total of 5-byte data, the flow advances to step #1112, and the MCU 10 sets the flag DBINIF to be 0. The MCU 21 returns to the main routine, and a series of communication operations are completed.

Figure 21A:
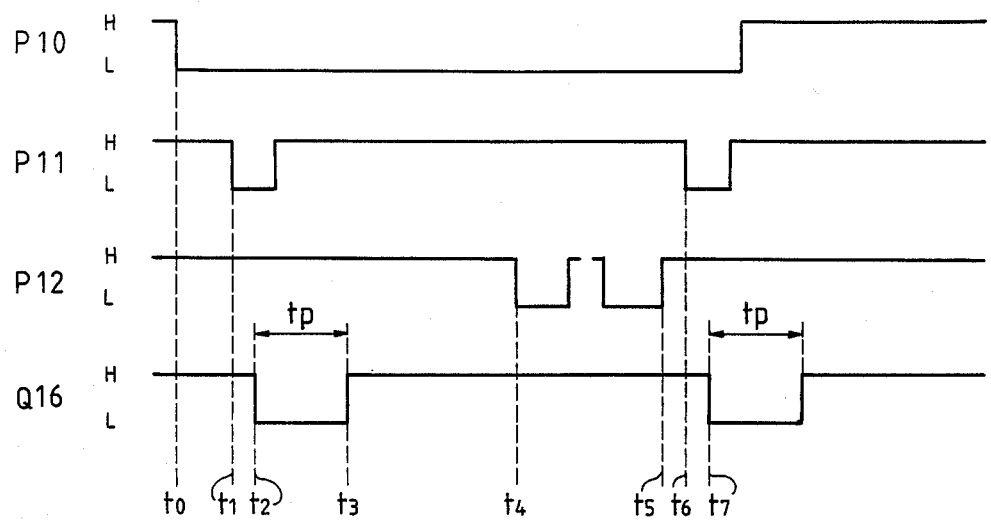
FIGS. 21A and 21B are timing charts in a release sequence.
Figure 21B:
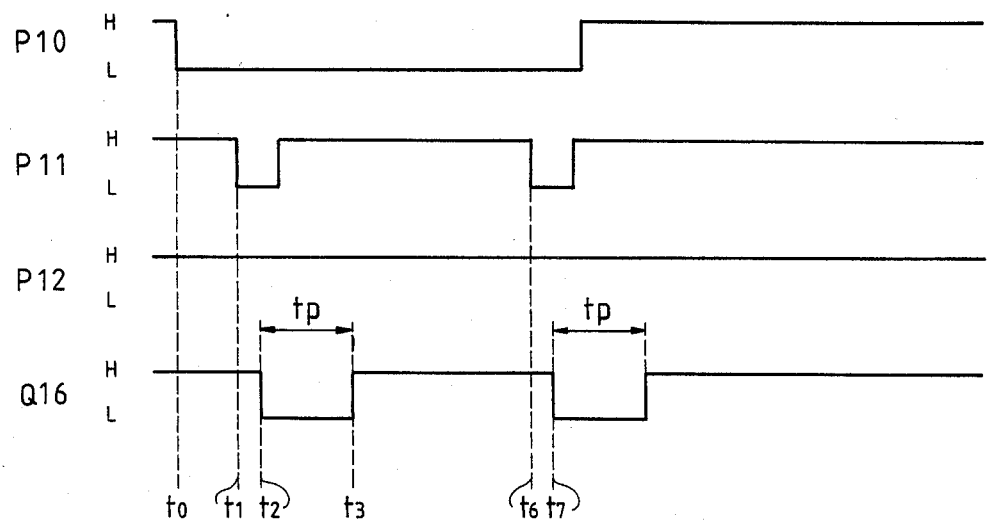

FIGS. 21A and 21B are timing charts in the release sequence. When a release button (not shown) of the camera 1 is depressed and the release switch SW1 is turned on, an input terminal P10 of the MCU 10 goes from H to L level, and this change is detected in step #1040 in FIG. 15 during interruption executed at predetermined time intervals. The flow then advances to step #1041, thus starting the release sequence in FIG. 15 (t =t0).

FIG. 21A is a timing chart when an exposure value is printed. In step #1041, the terminal P11 is set at L level for a predetermined period of time, thus generating a printing signal to the MCU 21 (t =t1). The MCU 21 detects that the terminal Q11 connected to the terminal P11 through the contacts 1b and 20b goes to L level in step #1504 in the loop of steps #1502 to #1507. The flow then advances to step #1506, and the printing routine shown in FIG. 19 is executed.

When the printing routine shown in FIG. 19 is executed, the MCU 21 sets the output terminal Q16 at L level in step #1701 (t =t2). The transistor Tr1 is turned on, and the printing lamp 26 is turned on. Thus, data displayed on the display LCD in step #1507 is projected onto a film (not shown), thus starting a printing operation. The MCU 21 measures a time tp required for the printing operation in step #1702, and the flow advances to step #1703. In step #1703, the terminal Q16 is set at H level to turn off the transistor Tr1, thus completing the printing operation (t =t3). Subsequently, in step #1704, the content of a memory DM(3) for storing a film frame count is incremented by one, and the flow returns to end the printing routine. The flow then advances from step #1506 to step #1507 in FIG. 17 to display data. If a film frame count printing mode is selected, the next frame can be printed even in a continuous photographing mode or without communicating with the camera 1.

Meanwhile, the MCU 10 activates the sequence in step #1042 after step #1041, and performs diaphragm control in step #1043. In step #1044, the shutter control is performed. In step #1045, the shutter-charging & film-feeding control is performed. Upon completion of step #1046, the flow returns to the main routine. The flow then jumps to step #1010 in the main routine of FIG. 14. In step #1010, a stack pointer is cleared, and the routine after step #1001 is executed. In step #1001, the photometry routine after the mirror-down operation is executed again. In step #1002, the information-setting routine is performed. In step #1003, the apex-calculating routine is executed. In step #1004, information is displayed. In step #1005, since the flag DBINIF is already set to be 0, the flow advances to step #1006. If it is determined in step #1006 if the flag EXPF of the data back flag information is 1, the flow advances to step #1007, and the communication routine is executed (t =t4). Upon completion of the communication (t =t5), the flow advances to step #1009, and the release interruption is enabled. Thus, the interruption routine shown in FIG. 15 is executed at predetermined time intervals. If the release button is kept depressed, processing from step #1041 is again executed (t =t6). After the communication routine, the flow advances from step #1501 to step #1507, the MCU 21 allows a display on the basis of data after the second photometry routine even in the exposure value printing mode. The flow advances to step #1502→step #1503→step #1504→step #1506, and a printing operation of a second frame is allowed (t =t7).

FIG. 21B is a timing chart when an exposure value is not printed. The processing content up to step #1004 in the main routine after a photographing operation of a first frame is performed is the same as that in FIG. 21A. In step #1005, since the flag DBINIF is already set to be 0, the flow advances to step #1006. Since it is determined in step #1006 that the flag EXPF of the data back flag information is 0, the flow advances to step #1008, and the release interruption is enabled. Thus, the interruption routine shown in FIG. 15 is executed at predetermined time intervals. If the release button is kept depressed, the processing from step #1041 is executed without executing the communication routine (t =t6). Since the communication is not performed, exposure value data is one before the release operation of the first frame. However, since frame count data is counted up in step #1704, the MCU 21 can print it, and no problem is posed. A printing operation of "year, month, day, hour, and minute" data as a basic function of the data back can be performed since these data are those stored in the MCU 21.

According to the second embodiment, when the data back is used in a normal manner, transmission of data from the camera to the data back is omitted. Therefore, a frame speed in a continuous photographing mode can be increased.

When a film frame count is printed, a signal generated every time a frame is photographed in a camera is received and film frame count data is incremented by one. Therefore, the printing operation of the frame count can be performed if data transmission is omitted. When the film frame count data is received from the camera, the film frame count data is replaced with the received data. Therefore, if data in the data back includes an error, the error is never accumulated.

(3) Third Embodiment

Figure 22:
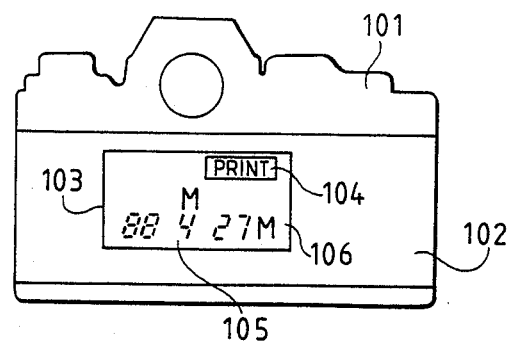
FIG. 22 is a view showing an outer appearance of a camera and a data back according to a third embodiment of the present invention.

FIG. 22 shows an outer appearance of a camera 101 according to a third embodiment of the present invention and a data back 202 mounted thereon. The data back 202 is mounted on the camera 101. The data back 102 has a data printing section for printing data on a film loaded in a portion (not shown) of the camera, so that an optical data printing operation is performed using a lamp or an LED. An LCD 103 is arranged to confirm data to be printed. A user can monitor a setting condition using a printing data display section (to be referred to as a data section hereinafter) 105, a film sensitivity display section (to be referred to as a sensitivity section hereinafter) 106, and a data printing setting display section (to be referred to as a setting section hereinafter) 104.

The data section 105 displays data to be printed, and a numerical value (a maximum of six digits) such as a simple serial number, and the like can be arbitrary set by an operation button (not shown).

The sensitivity section 106 displays a symbol mark according to an ISO sensitivity of a film presently loaded in the camera. When a film of IS0100 is loaded, "M" is displayed. When a high-sensitivity film is used, "H" is displayed, and when a low-sensitivity film is used, "L" is displayed. These marks may be selected by automatically detecting the sensitivity using a DX code of a film or manually setting with the above-mentioned operation switch.

The setting section 104 displays whether or not a data printing operation is performed. When the data printing operation is performed, "PRINT" is displayed, as shown in FIG. 22; otherwise, nothing is displayed. Selection of these can also be arbitrarily set by the above-mentioned operation button.

Figure 23:
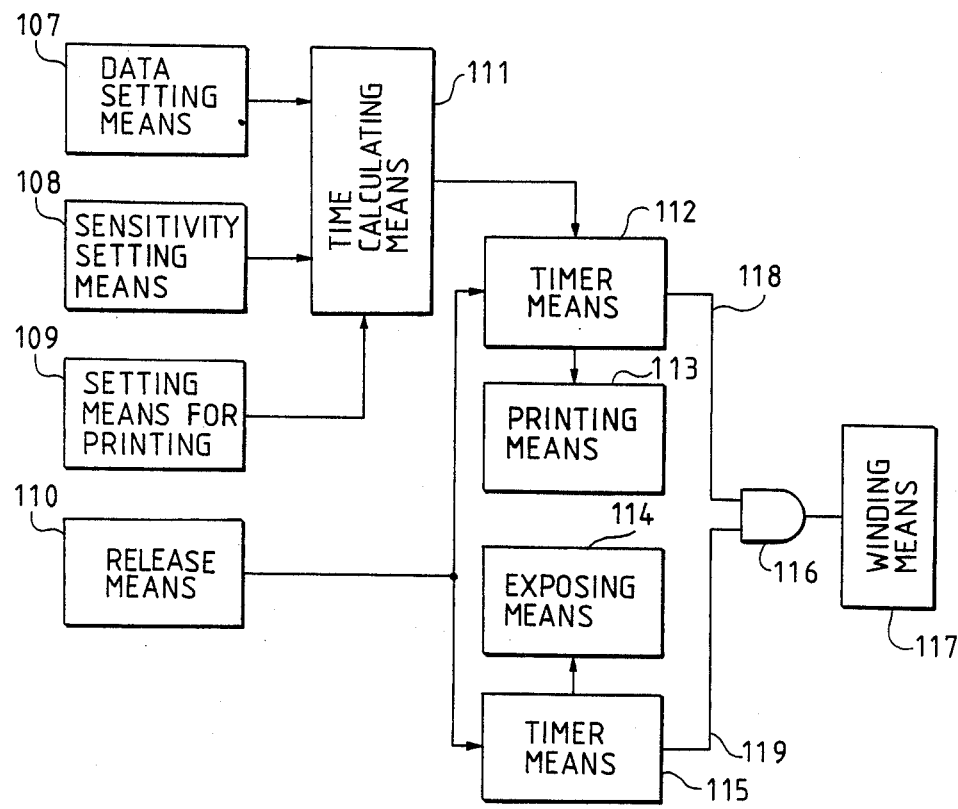
FIG. 23 is an operation block diagram of the camera and the data back.

FIG. 23 is a block diagram of internal circuits of the camera 101 and the data back 102 shown in FIG. 22.

A data-setting means 107 has a function of setting data to be printed, e.g., year, month, and day data, numerical value data, and the like, outputs the set data to a printing means 113 through a line (not shown), and outputs a time signal necessary for a printing operation according to the number of digits of set data, and the like to a time-calculating means 111, as shown in FIG. 23. A parameter according to the number of digits of data is required since the printing operation is performed by a dynamic drive method in units of digits.

A sensitivity-setting means 108 sets a film sensitivity of a film used, and outputs an identification signal according to the sensitivity to the time-calculating means 111, as shown in FIG. 23.

A setting means 109 for printing sets whether or not a data printing operation is performed, and outputs a signal indicating that the printing operation is performed or not to the time-calculating means 111, as shown in FIG. 23.

The time-calculating means 111 calculates a time suitable for a printing operation using the three input signals according to the type of data and the film sensitivity, and outputs it as a printing time signal to a first timer means 112. As the number of digits by the data-setting means 107 is increased, or as the sensitivity set by the sensitivity-setting means 108 becomes lower, the time-calculating means 111 sets a signal having a longer printing time.

When the setting means 109 sets that the data printing operation is not performed, the time-calculating means 111 outputs "0" to the first timer means 112.

A release means 110 starts the operation of the camera upon depression of a button, and outputs a release signal to the first timer means 112 and a second timer means 115.

The first timer means 112 measures a time set by the above-mentioned printing time signal in response to the input release signal as a start signal.

Since the first timer means 112 outputs a printing signal to the printing means 113 in response to the input release signal until time measurement is completed, the above-mentioned lamp or LED is turned on to perform a data printing operation during this interval.

On the other hand, when the release signal from the release means 110 is input, the second timer means 115 activates an exposing means 114, i.e., a device for driving a shutter, and sets the shutter in an open state until time measurement based on a shutter time preset in the second timer means 115 by a means (not shown) is completed. As a result, an object image is exposed on a film.

After the first and second timer means 112 and 115 complete predetermined time measurements, they output first and second completion signals 118 and 119 to an AND gate 116.

When the AND gate 116 receives both the first completion signal 118, i.e., a printing completion signal, and the second completion signal 119, i.e., an exposure completion signal, it outputs a winding signal to a winding means 117.

In response to the winding signal, the winding means 117 performs a predetermined operation to prepare for the next photographing operation as well as a winding operation of a film.

With the above-mentioned means, data printing, shutter time, and film winding timings are controlled as follows.

When a printing time is shorter than the shutter time, the first completion signal 118 from the first timer means 112 is output, and then, the exposure completion signal 119 from the second timer means 115 is output.

Therefore, the winding means 117 is operated after the latter signal is input, i.e., the exposure by the shutter is completed.

On the other hand, when the printing time is longer than the shutter time, the relationship between the completion signals 118 and 119 along the time base is reversed. Therefore, the winding means 117 is operated after the printing operation is completed.

When the setting means 119 sets that the printing operation is not performed, the timer means 112 is set to be zero, and immediately outputs the completion signal 118 in response to the input release signal. The winding means 117 is operated under the control of the completion signal 119 from the second timer means 115, i.e., completion of exposure.

Figure 24A:
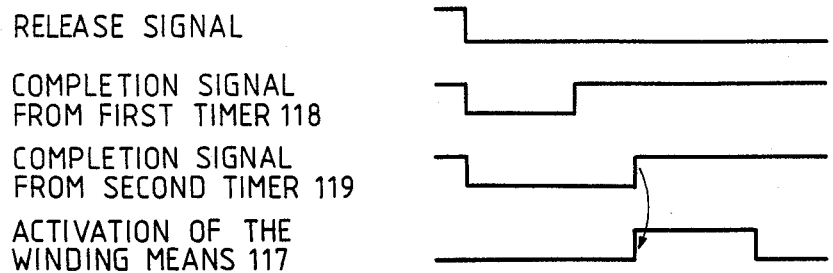
FIGS. 24A and 24B are timing charts of FIG. 23.
Figure 24B:
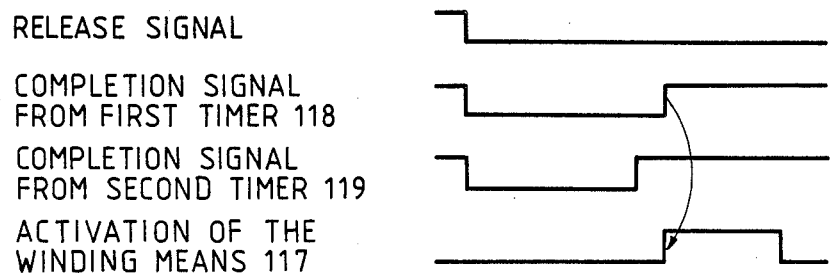

FIGS. 24A and 24B are timing charts of the embodiment shown in FIG. 23. FIG. 24A shows a state wherein the printing time is shorter than the shutter time, and the operation of the winding means 117 is controlled by the second completion signal 119.

Contrary to this, FIG. 24B shows a state wherein the printing time is longer than the shutter time and the operation of the winding means 117 is controlled by the first completion signal 118.

FIGS. 25A to 25E and FIG. 26 are flow charts and a block diagram when a fourth embodiment of the present invention is arranged under the control of a CPU 125.

Figure 25C:
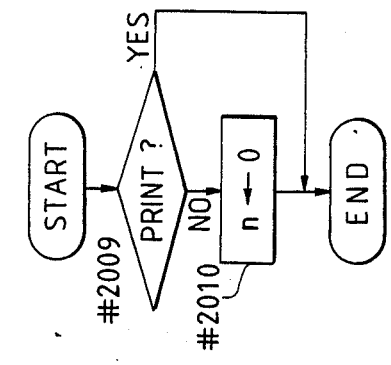
FIGS. 25A to 25E are flow charts according to a fourth embodiment of the present inveniton.
Figure 25B:
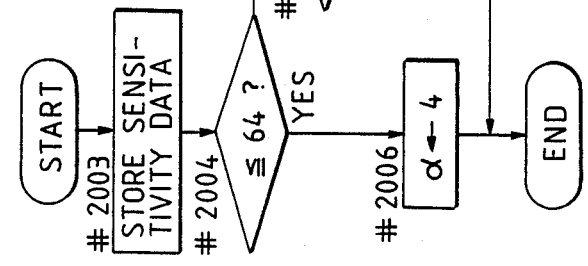
Figure 25A:
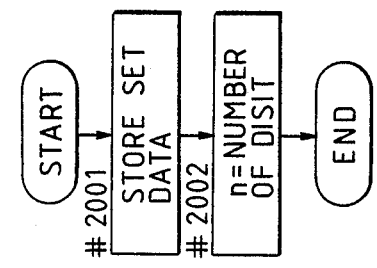
Figure 25D:
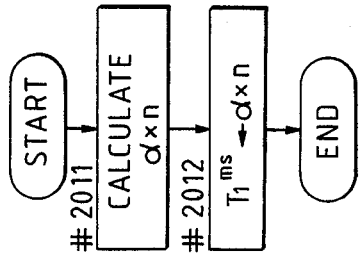
Figure 25E:
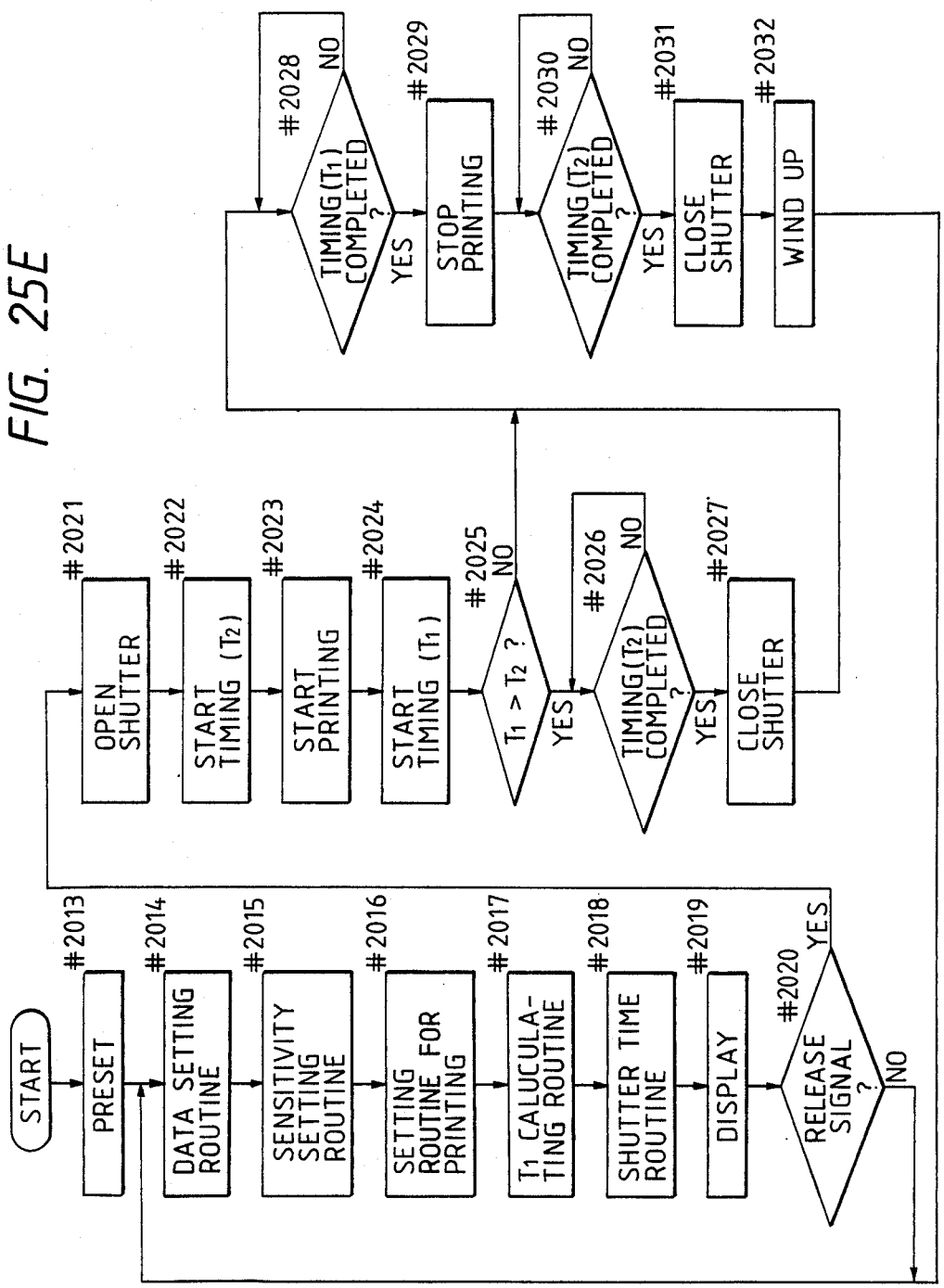

FIGS. 25A to 25E, FIGS. 25A to 25D show subroutines, and FIG. 25E shows a main routine. The operations of the subroutines will be described below.

FIG. 25A shows a data-setting routine. In step #2001, set printing data is stored in a memory. In step #2002, the number of digits of the set data is stored in a memory named n. The above steps correspond to the operation of the data-setting means 107 in FIG. 23.

FIG. 25B shows a sensitivity-setting routine. In step #2003, a selected film sensitivity is stored in a memory. It is checked in step #2004 if the selected sensitivity is equal to or lower than IS064, and if NO in step #2004, it is checked in step #2005 if the selected sensitivity is equal to or lower than IS0160.

If YES in step #2004, "4" is stored in a memory named $\alpha$ in step #2006; if NO in step #2004 and YES in step #2005, "2" is stored in the memory $\alpha$ in step #2007; and if NO in step #2005, "1" is stored in the memory $\alpha$ in step #2008.

In this embodiment, film sensitivities are classified into three ranks, and its ratio is set to be 1 : 2 : 4. As will be described later, this ratio can be used as a ratio of times necessary for printing operations at corresponding film sensitivities. However, the film sensitivities may be classified into a larger number of ranks or may be merely classified into two ranks.

The above steps correspond to the operation of the sensitivity-setting means 108 in FIG. 23.

FIG. 25C shows a setting routine for printing. In step #2009, it is checked whether or not a printing operation is performed. If YES in step #2009, the flow ends; otherwise, "0" is stored in the memory n shown in FIG. 25A. In this case, the stored data n has a priority over FIG. 25A. The above steps correspond to the operation of the setting means 109 in FIG. 23.

FIG. 25D shows a portion for calculating a time necessary for a printing operation, called a $T_1$ calculating routine. In step #2011, the data n set in step #2002 in the data-setting routine is multiplied with $\alpha$ in one of steps #2006 to #2008 in the sensitivity-setting routine.

In step #2012, the product is stored in a memory named $T_1$. In general, a unit is on the order of ms, and in this embodiment, $T_1$ falls within the range of several ms to several tens of ms. The above steps correspond to the operation of the time-calculating means 111 in FIG. 23.

The main routine shown in FIG. 25E will be described below. After power-on, a preset operation including a reset operation is performed in step #2013. In steps #2014 to #2017, the data-setting routine, sensitivity-setting routine, setting routine for printing, and $T_1$ calculating routine of the subroutines described with reference to FIGS. 25A to 25D are executed.

In step #2018, a shutter time routine is executed, that is, the shutter time is calculated by an apex calculation. The calculation result is stored in a memory named $T_2$ (not shown).

In step #2019, various data are displayed on a display including the LCD 103 shown in FIG. 22 on the basis of the calculation result.

The main routine includes step #2020 as a function of periodically monitoring generation of a release signal. When no release signal is generated, the flow returns to step #2014 and the above-mentioned routines are executed.

When generation of the release signal is detected in step #2020, the shutter is opened in step #2021. In step #2022, measurement of $T_2$, i.e., the shutter time is started. The above operations correspond to functions of the release means 110, exposing means 114, and second timer means 115 in FIG. 23.

In step #2023, data printing is started. In step #2024, measurement of $T_1$, i.e., the printing time is started. The above operations correspond to functions of the release means 110, printing means 113, and first timer means 112 in FIG. 23.

In step #2025, $T_1$ and $T_2$ are compared with each other.

If it is determined in step #2025 that $T_1$, i.e., the printing time is shorter, completion of measurement of $T_1$ is waited in step #2028. Upon completion of measurement, the printing operation is stopped in step #2029. The above steps correspond to the operations of the first timer means 112 and the printing means 113 in FIG. 23.

Thereafter, $T_2$, i.e., the shutter time is measured in step #2030. Upon completion of measurement, the shutter is closed in step #2031, and a film winding operation is performed in step #2032. The flow returns to the initial routine to prepare for the next release operation. The above steps correspond to the operations of the second timer means 115 and the exposing means 114, the operations of the AND gate 116, and the winding means 117 shown in FIG. 23, and FIG. 24A.

If it is determined in step #2025 that $T_1$, i.e., the printing time is longer, $T_2$, i.e., the shutter time is measured in step #2026. Upon completion of measurement, the shutter is closed in step #2027. Thereafter, completion of measurement of $T_1$ is waited in step #2028, and the printing operation is stopped in step #2029.

In this routine, completion of measurement of $T_2$ is re-confirmed in steps #2030 and #2031. Since the measurement is completed in steps #2026 and #2027, steps #2030 and #2031 can be merely passed.

Thereafter, the film winding operation is performed in step #2032. The above steps correspond to the operations in FIG. 24B.

The flow returns to the initial routine, i.e., step #2014, and the operations are repeated to prepare for the next release operation.

As described above, the flow charts are programmed so that the film winding operation is performed after measurement of a longer one of $T_1$ and $T_2$ is completed, i.e., measurement of both $T_1$ and $T_2$ is completed.

When the shutter open operation timing and the printing start timing shown in steps #2021 and #2024 are greatly different from each other or their relationship is reversed, a shift term can be added to $T_1$ and $T_2$.

Figure 26:
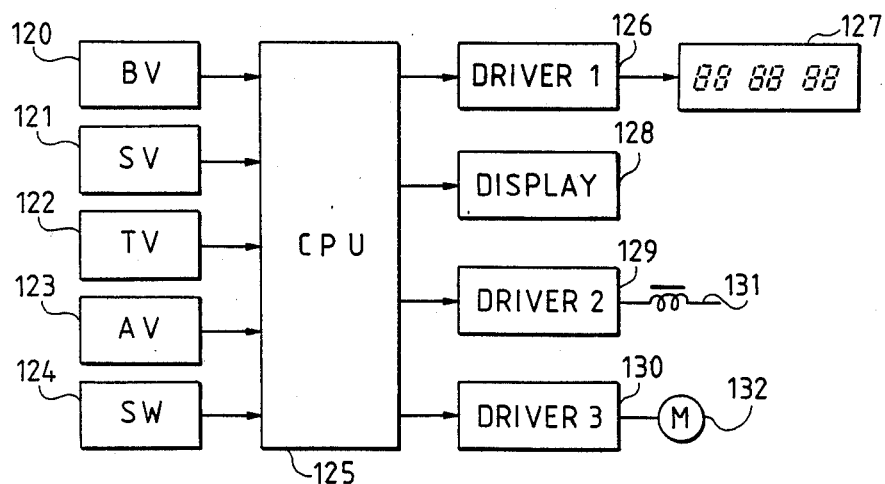
FIG. 26 is a block diagram of the fourth embodiment.

FIG. 26 is a block diagram of a camera using this embodiment.

A CPU 125 receives luminance information of an object from a photometer 120 represented by BV, sensitivity information of a film used from a film sensitivity-setting circuit 121 represented by SV, shutter time information set by a shutter time setting circuit 122 represented by TV, diaphragm value information set by a diaphragm value setting circuit 123 represented by AV, and various mode information set by switches and sequence information representing an operating condition of a camera from a condition detector 124 represented by SW. The CPU 125 performs calculations on the basis of various information, and causes a first driver 126 to drive an LED array 127 in association with a data back function. The LED array 127 has six digits of 7-segment LEDs for data printing. A method of printing data using lamps in an LCD is equivalently used in place of the method using the LED array 127.

A display 128 informs to a user photographing information or printing data information using various display devices including the LCD 103.

Second and third drivers 129 and 130 drive a magnet 131 for opening/closing the shutter and a motor 132 for performing a film winding operation on the basis of the information from the above-mentioned condition detector 124.

As described above, according to the third and fourth embodiments of the present invention, the film winding operation is performed after the data printing operation is completed. Thus, data to be recorded can be reliably printed on a film, and the printing operation and the film winding operation are not simultaneously performed. Therefore, data can be prevented from being blurred.

If the number of digits of printing data is set to be small or a high-sensitivity film is used, a printing time can be shortened, and a film winding start timing need not be delayed. Therefore, a quick preparation can be performed for the next shutter chance.

What is claimed is:

1. A film winding device comprising:
   first timer means for measuring a first time associated with a data printing operation;
   second timer means for measuring a second time associated with a shutter;
   logical sum means for receiving signals output from said first and second timer means, discriminating whether or not both said first and second timer means output completion signals, and changing its output on the basis of the discrimination result; and
   film winding means for detecting a change in output from said logical sum means to start a film winding operation.

2. A device according to claim 1, wherein the first time is a sum of a data printing time and a fixed time.

3. A device according to claim 1, wherein the second time is a sum of a shutter time and a fixed time.

4. A device according to claim 1, wherein when the data printing operation is not performed, zero is input to said first timer means as the first time.

5. A device according to claim 1, wherein the first time is determined on the basis of the number of digits of printing data.

6. A device according to claim 1 wherein the first time is determined on the basis of a film sensitivity.

* * * * *